United States Patent
Du et al.

(10) Patent No.: US 11,222,530 B2
(45) Date of Patent: Jan. 11, 2022

(54) DRIVING INTENTION DETERMINING METHOD AND APPARATUS

(71) Applicant: Huawei Technologies Co., Ltd., Shenzhen (CN)

(72) Inventors: Mingbo Du, Shanghai (CN); Junqiang Shen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 225 days.

(21) Appl. No.: 16/695,847

(22) Filed: Nov. 26, 2019

(65) Prior Publication Data
US 2020/0098252 A1 Mar. 26, 2020

Related U.S. Application Data

(63) Continuation of application No. PCT/CN2018/085201, filed on Apr. 28, 2018.

(30) Foreign Application Priority Data

May 27, 2017 (CN) .......................... 201710389422.6

(51) Int. Cl.
*G08G 1/01* (2006.01)
*G06K 9/00* (2006.01)
*G08G 1/052* (2006.01)

(52) U.S. Cl.
CPC ....... *G08G 1/0133* (2013.01); *G06K 9/00798* (2013.01); *G06K 9/00805* (2013.01);
(Continued)

(58) Field of Classification Search
CPC .. G08G 1/0133; G08G 1/052; G06K 9/00805; G06K 9/00825; G06K 2209/23; G06K 9/00798
See application file for complete search history.

(56) References Cited

U.S. PATENT DOCUMENTS 8,788,134 B1 7/2014 Litkouhi et al.
2016/0357188 A1* 12/2016 Ansari ............... G06K 9/00805
(Continued)

FOREIGN PATENT DOCUMENTS

CN 102568200 A 7/2012
CN 103318181 A 9/2013
(Continued)

OTHER PUBLICATIONS

Wu, J., "Research on Driver-vehicle-road Factors Considered Driving Risk Evaluation Method," Nov. 2015, 76 pages.
(Continued)

*Primary Examiner* — Peter D Nolan
*Assistant Examiner* — Demetra R Smith-Stewart
(74) *Attorney, Agent, or Firm* — Conley Rose, P.C.

(57) ABSTRACT

A driving intention determining method includes obtaining status information of traffic targets in a driving environment, where the traffic targets include a traffic target in a moving state and traffic targets in a static state, and status information of the traffic targets in a static state includes at least indication information of a traffic sign and road boundary information, determining a risk field of the driving environment based on the status information of the traffic targets in the driving environment, for any other vehicle in the driving environment, determining a driving track of the other vehicle in the driving environment based on the risk field, and determining driving intention of the other vehicle based on the driving track of the other vehicle in the driving environment.

20 Claims, 8 Drawing Sheets

(52) U.S. Cl.
CPC ......... *G06K 9/00825* (2013.01); *G08G 1/052* (2013.01); *G06K 2209/23* (2013.01)

(56) References Cited

U.S. PATENT DOCUMENTS

| | | | |
|---|---|---|---|
| 2017/0154529 A1* | 6/2017 | Zhao | B60W 30/12 |
| 2018/0057001 A1* | 3/2018 | Hu | B60W 10/11 |
| 2018/0215386 A1* | 8/2018 | Naserian | G08G 1/096783 |
| 2020/0346643 A1* | 11/2020 | Woon | B60W 60/0027 |

FOREIGN PATENT DOCUMENTS

| | | |
|---|---|---|
| CN | 103996312 A | 8/2014 |
| CN | 104239741 A | 12/2014 |
| CN | 104494600 A | 4/2015 |
| CN | 104951764 A | 9/2015 |

OTHER PUBLICATIONS

Van Dan, N., et al., "Bayesian-Networks-Based Motion Estimation for a Highly-Safe Intelligent Vehicle," SICE-ICASE, International Joint Conference, Oct. 18-21, 2006, pp. 6023-6026.

Hu, S., "Research on early warning model of vehicle driving safety for driving assistance system," South China University of Technology, Feb. 15, 2017, 6 pages.

* cited by examiner

DRIVING INTENTION DETERMINING METHOD AND APPARATUS

CROSS-REFERENCE TO RELATED APPLICATIONS

This application is a continuation of International Patent Application No. PCT/CN2018/085201, filed on Apr. 28, 2018, which claims priority to Chinese Patent Application No. 201710389422.6, filed on May 27, 2017. The disclosures of the aforementioned applications are hereby incorporated by reference in their entireties.

TECHNICAL FIELD

This application relates to the field of traffic technologies, and in particular, to a driving intention determining method and apparatus.

BACKGROUND

With rapid development of a self-driving technology and a driver assistance system, to improve security of a self-driving vehicle or a vehicle that uses the driver assistance system in a driving process, driving intention of another vehicle in a driving environment in which the vehicle is located usually needs to be predicted, so that proper and safe decision control may be performed on the vehicle based on the driving intention of the other vehicle. The driving intention may include left lane change, right lane change, straight drive, and the like.

A driving intention determining method based on a Bayesian network is provided. Specifically, for each another vehicle in the driving environment, Bayesian network models corresponding to destination intention, track intention, and velocity intention of the other vehicle are separately established. Status information of all traffic targets in the driving environment is used as input of the three Bayesian network models, to obtain evidence nodes in the three Bayesian network models. For each Bayesian network model in the three Bayesian network models, a probability of each intention node (that is, a probability that each intention is about to occur) in the Bayesian network model is calculated using conditional probability distribution of the evidence nodes in the Bayesian network model, and an intention node with a largest probability is selected from the intention nodes as an intention prediction result of the Bayesian network model. The driving intention of the other vehicle is determined based on intention prediction results of the three Bayesian network models.

However, the conditional probability distribution of the nodes in the Bayesian network model is usually difficult to obtain accurately. As a result, accuracy of the intention prediction result of the Bayesian network model in the method is relatively low, and consequently, accuracy of driving intention subsequently determined based on the intention prediction result is relatively low. In addition, if driving intention of a plurality of other vehicles needs to be determined, in the method, three independent Bayesian network models need to be established for all the plurality of other vehicles. In this case, a process of determining the driving intention of the plurality of other vehicles is complex, and determining efficiency is relatively low.

SUMMARY

To improve accuracy and determining efficiency of determined driving intention, this application provides a driving intention determining method and apparatus. The technical solutions are as follows:

According to a first aspect, a driving intention determining method is provided. The method includes obtaining status information of traffic targets in a driving environment, where the traffic targets include a traffic target in a moving state and traffic targets in a static state, and status information of the traffic targets in a static state includes at least indication information of a traffic sign and road boundary information, determining a risk field of the driving environment based on the status information of the traffic targets in the driving environment, where field strength of the risk field is a risk degree value of the driving environment, the risk field includes a kinetic energy field and a potential energy field, a kinetic energy field of the traffic target is obtained using a first formula based on coordinates of the traffic target in the driving environment, a risk gain constant corresponding to a type of the traffic target, a driving intention representation vector corresponding to a turn light status of the traffic target, and equivalent mass, a velocity, and an acceleration of the traffic target, where the first formula is as follows:

$$\vec{E}_{D\_ij} = \frac{A_i M_i}{|\vec{d}_{ij}|^{\varepsilon_1}} \{\{\exp[\varepsilon_2 v_{ix} \cos(\theta_{ix})] + \exp[\varepsilon_3 v_{iy} \cos(\theta_{iy})] + \exp[\varepsilon_4 a_{ix} \cos(\theta_{iax})] + \exp[\varepsilon_5 a_{iy} \cos(\theta_{iay})]\} \vec{e}_{ij} + \varepsilon_6 \vec{e}_{light}\},$$

where $\vec{E}_{D\_ij}$ is a risk degree value generated by the traffic target in the driving environment, $A_i$ is the risk gain constant corresponding to the type of the traffic target, $M_i$ is the equivalent mass of the traffic target, $\vec{d}_{ij}$ is a direction vector from $(x_i, y_i)$ to $(x_j, y_j)$, $(x_i, y_i)$ are the coordinates of the traffic target in the driving environment, $(x_j, y_j)$ are coordinates that are of any location in the driving environment and that are based on the driving environment, $\vec{e}_{ij}$ is a unit vector in the $\vec{d}_{ij}$ direction, $v_{ix}$ is a velocity component of the traffic target on a horizontal axis, $v_{iy}$ is a velocity component of the traffic target on a vertical axis, $a_{ix}$ is an acceleration component of the traffic target on the horizontal axis, $a_{iy}$ is an acceleration component of the traffic target on the vertical axis, $\theta_{ix}$ is an angle between the velocity component of the traffic target on the horizontal axis and $\vec{d}_{ij}$, $\theta_{iy}$ is an angle between the velocity component of the traffic target on the vertical axis and $\vec{d}_{ij}$, $\theta_{iax}$ is an angle between the acceleration component of the traffic target on the horizontal axis and $\vec{d}_{ij}$, $\theta_{iay}$ is an angle between the acceleration component of the traffic target on the vertical axis and $\vec{d}_{ij}$, $\vec{e}_{light}$ is the driving intention representation vector corresponding to the turn light status of the traffic target, and $\varepsilon_1, \varepsilon_2, \varepsilon_3, \varepsilon_4, \varepsilon_5,$ and $\varepsilon_6$ are all constants greater than 0, for any other vehicle in the driving environment, determining a driving track of the other vehicle in the driving environment based on the risk field, and determining driving intention of the other vehicle based on the driving track of the other vehicle in the driving environment.

In an embodiment of the present disclosure, only the risk field of the driving environment needs to be constructed to determine the driving intention of the other vehicle. This greatly simplifies a driving intention determining process, thereby improving determining efficiency. In addition, the status information that is of all the traffic targets and that affects the driving intention is comprehensively considered using the risk field of the driving environment. The accuracy of the driving intention of the other vehicle determined based on the risk field is relatively high. Moreover, when the driving track and the driving intention of the other vehicle in the driving environment are effectively determined, proper decision control may be subsequently performed based on the driving track and the driving intention of the other vehicle, thereby improving active safety of a vehicle.

The determining a risk field of the driving environment based on the status information of the traffic targets in the driving environment includes, for each traffic target in the driving environment, determining, based on status information of the traffic target, whether the traffic target is a traffic target in a moving state or a traffic target in a static state, and when the traffic target is a traffic target in a moving state, determining a kinetic energy field of the traffic target based on the status information of the traffic target, where field strength of the kinetic energy field of the traffic target is a risk degree value generated by the traffic target in the driving environment, or when the traffic target is a traffic target in a static state, determining a potential energy field of the traffic target based on the status information of the traffic target, where field strength of the potential energy field of the traffic target is a risk degree value generated by the traffic target in the driving environment, and adding kinetic energy fields of all traffic targets in a moving state and potential energy fields of all traffic targets in a static state in the driving environment together, to obtain the risk field of the driving environment.

In this embodiment of the present disclosure, the risk field of the driving environment is obtained by adding the kinetic energy fields of all the traffic targets in a moving state and the potential energy fields of all the traffic targets in a static state in the driving environment together. In this case, potential risks generated by all the traffic targets in the driving environment are comprehensively considered using the risk field. This may reflect an interaction between all the traffic targets, so that accuracy of the driving intention subsequently determined based on the risk field can be relatively high.

The determining a potential energy field of the traffic target based on the status information of the traffic target includes determining, based on the status information of the traffic target, whether the traffic target is a static obstacle or a traffic sign, and when the traffic target is a static obstacle, determining the potential energy field of the traffic target based on location information and a size that are included in the status information of the traffic target, or when the traffic target is a traffic sign, determining the potential energy field of the traffic target based on location information and a type that are included in the status information of the traffic target.

Because a potential energy field of a static obstacle is related only to mass of the static obstacle, when the traffic target is a static obstacle, the potential energy field of the traffic target may be determined based on the location information and the size that are included in the status information of the traffic target. In addition, because a potential energy field of a traffic sign is related only to a type of the traffic sign, when the traffic target is a traffic sign, the potential energy field of the traffic target may be determined based on the location information and the type that are included in the status information of the traffic target.

The determining the potential energy field of the traffic target based on location information and a size that are included in the status information of the traffic target includes determining coordinates of the traffic target in the driving environment based on the location information of the traffic target, multiplying a length, a width, and a height that are included in the size of the traffic target to obtain equivalent mass of the traffic target, and obtaining the potential energy field of the traffic target using a second formula based on the coordinates of the traffic target in the driving environment and the equivalent mass of the traffic target, where the second formula is as follows:

$$\vec{E}_{S\_ij} = \frac{M_i}{|\vec{d}_{ij}|^{\varepsilon_1}} \vec{e}_{ij},$$

where $\vec{E}_{x\_ij}$ is the risk degree value generated by the traffic target in the driving environment, $M_i$ is the equivalent mass of the traffic target, $\vec{d}_{ij}$ is the direction vector from $(x_i,y_i)$ to $(x_j,y_j)$, $(x_i,y_i)$ are the coordinates of the traffic target in the driving environment, $(x_j,y_j)$ are the coordinates that are of any location in the driving environment and that are based on the driving environment, $\vec{e}_{ij}$ is the unit vector in the $\vec{d}_{ij}$ direction, and $\varepsilon_1$ is a constant greater than 0.

The determining the potential energy field of the traffic target based on location information and a type that are included in the status information of the traffic target includes determining coordinates of the traffic target in the driving environment based on the location information of the traffic target, determining, from a plurality of stored risk gain constants, a risk gain constant corresponding to the type of the traffic target, and obtaining the potential energy field of the traffic target using a third formula based on the coordinates of the traffic target in the driving environment and the risk gain constant corresponding to the type of the traffic target, where the third formula is as follows:

$$\vec{E}_{T\_ij} = \frac{B_i}{|\vec{d}_{ij}|^{\varepsilon_1}} \vec{e}_{ij},$$

where $\vec{E}_{T\_ij}$ is the risk degree value generated by the traffic target in the driving environment, $B_i$ is the risk gain constant corresponding to the type of the traffic target, $\vec{d}_{ij}$ is the direction vector from $(x_i,y_i)$ to $(x_j,y_j)$, $(x_i,y_i)$ are the coordinates of the traffic target in the driving environment, $(x_j,y_j)$ are the coordinates that are of any location in the driving environment and that are based on the driving environment, $\vec{e}_{ij}$ is the unit vector in the $\vec{d}_{ij}$ direction, and $\varepsilon_1$ is a constant greater than 0.

The determining a driving track of the other vehicle in the driving environment based on the risk field includes, using a location point of the other vehicle as an initial iteration point of the risk field, and performing iterative calculation on the risk field using a gradient descent method, to obtain a plurality of iterative points, and determining a track formed by the plurality of iteration points as the driving track of the other vehicle in the driving environment.

It should be noted that the gradient descent method is an optimization algorithm, and is usually referred to as a steepest descent method. In the method, a new search direction of each iteration is determined using a negative gradient direction, so that a function value of a to-be-optimized target function can be reduced after each iteration.

In this case, the location point of the other vehicle is used as the initial iteration point of the risk field, and the plurality of iterative points obtained after iterative calculation is performed on the risk field using the gradient descent method are a plurality of location points that can reduce the field strength of the risk field at a fastest speed and that start from the location point of the other vehicle. A driver usually controls a vehicle to travel along a place at which the field strength of the risk field is weakest. The track formed by the plurality of iteration points may be extracted as the driving track of the other vehicle in the driving environment.

The determining driving intention of the other vehicle based on the driving track of the other vehicle in the driving environment includes determining a track feature vector corresponding to the driving track of the other vehicle in the driving environment, and determining the driving intention of the other vehicle based on the track feature vector using a driving intention classifier.

In this embodiment of the present disclosure, intelligent classification and matching of the track feature vector may be simply and efficiently completed using the driving intention classifier, so that the driving intention of the other vehicle can be quickly identified.

The determining a track feature vector corresponding to the driving track of the other vehicle in the driving environment includes obtaining n sampling points from the driving track of the other vehicle in the driving environment, where n is a natural number greater than 1, determining n−1 track direction angles of the driving track based on coordinates of the n sampling points in the driving environment, and determining the track feature vector based on the n−1 track direction angles.

In this embodiment of the present disclosure, the track feature vector of the driving track may be determined based on the n−1 track direction angles of the driving track. In this case, the track feature vector can accurately reflect a feature of a moving direction of the driving track, so that feature extraction of the driving track can be more accurate and reliable.

The operation of determining n−1 track direction angles of the driving track based on coordinates of the n sampling points in the driving environment may be, for each of first n−1 sampling points of the n sampling points, obtaining a direction vector from coordinates of the sampling point in the driving environment to coordinates of a next adjacent sampling point in the driving environment using a fourth formula, obtaining a target angle of the sampling point based on the direction vector using a fifth formula, and obtaining a track direction angle of the sampling point based on the target angle of the sampling point using a sixth formula.

The fourth formula is as follows:

$$\vec{e}_k = (x_{k+1} - x_k, y_{k+1} - y_k), k \in [1, n-1],$$

The fifth formula is as follows:

$$\beta_k = \begin{cases} \dfrac{\cos^{-1}(\vec{e}_k \cdot \vec{e}_0)}{|\vec{e}_k| \cdot |\vec{e}_0|} \cdot \dfrac{180}{\pi}, & y_{k+1} - y_k \geq 0 \\ \left(2\pi - \dfrac{\cos^{-1}(\vec{e}_k \cdot \vec{e}_0)}{|\vec{e}_k| \cdot |\vec{e}_0|}\right) \cdot \dfrac{180}{\pi}, & y_{k+1} - y_k < 0 \end{cases}, k \in [1, n-1].$$

The sixth formula is as follows:

$$\theta_k = \begin{cases} 360 - \beta_k, & \beta_k \geq 180 \\ \beta_k, & \beta_k < 180 \end{cases}, k \in [1, n-1].$$

$\vec{e}_k$ is a direction vector from $(x_k, y_k)$ to $(x_{k+1}, y_{k+1})$, $(x_k, y_k)$ are the coordinates of the sampling point in the driving environment, $(x_{k+1}, y_{k+1})$ are the coordinates of the next sampling point in the driving environment, $\beta_k$ is the target angle of the sampling point, $\theta_k$ is the track direction angle of the sampling point, $\vec{e}_0$ is a unit vector on a horizontal axis, and k is a location of the sampling point among the n sampling points.

The operation of determining the driving intention of the other vehicle based on the track feature vector using a driving intention classifier may be, using the track feature vector as input of the driving intention classifier, calculating, by the driving intention classifier, a Euclidean distance between the track feature vector and each of a plurality of classification hyperplanes of the driving intention classifier, and determining, by the driving intention classifier as the driving intention of the other vehicle, driving intention corresponding to a classification hyperplane that has a minimum Euclidean distance from the track feature vector and that is of the plurality of classification hyperplanes.

According to a second aspect, a driving intention determining apparatus is provided. The driving intention determining apparatus has functions of implementing the driving intention determining method in the first aspect. The driving intention determining apparatus includes at least one module. The at least one module is configured to implement the driving intention determining method provided in the first aspect, and the at least one module may be implemented using a processor and a memory.

According to a third aspect, a driving intention determining apparatus is provided. The driving intention determining apparatus includes a processor and a memory. The memory is configured to store a program for supporting the driving intention determining apparatus in performing the driving intention determining method provided in the first aspect, and store data used to implement the driving intention determining method provided in the first aspect. The processor is configured to execute the program stored in the memory to implement the driving intention determining method provided in the first aspect. The driving intention determining apparatus may further include a communications bus. The communications bus is configured to establish a connection between the processor and the memory.

According to a fourth aspect, a computer readable storage medium is provided. The computer readable storage medium stores an instruction. When the instruction runs on a computer, the computer performs the driving intention determining method according to the first aspect.

According to a fifth aspect, a computer program product that includes an instruction is provided. When the instruction runs on a computer, the computer performs the driving intention determining method according to the first aspect.

Technical effects brought in the second aspect, the third aspect, the fourth aspect, and the fifth aspect are similar to those achieved by corresponding technical means in the first aspect. Details are not described again herein.

Beneficial effects brought by the technical solutions provided in this application are that after the status information of the traffic targets in the driving environment is obtained, the risk field of the driving environment may be determined based on the status information of the traffic targets in the driving environment. Because the field strength of the risk field is the risk degree value of the driving environment, for any other vehicle in the driving environment, the driving track of the other vehicle in the driving environment may be determined based on the risk field. Then, the driving intention of the other vehicle may be determined based on the driving track of the other vehicle in the driving environment. In embodiments of the present disclosure, only the risk field of the driving environment needs to be constructed to determine the driving intention of the other vehicle. This greatly simplifies a driving intention determining process, thereby improving determining efficiency. In addition, the status information that is of all the traffic targets and that affects the driving intention is comprehensively considered using the risk field of the driving environment. The accuracy of the driving intention of the other vehicle determined based on the risk field is relatively high. Moreover, when the driving track and the driving intention of the other vehicle in the driving environment are effectively determined, proper decision control may be subsequently performed based on the driving track and the driving intention of the other vehicle, thereby improving active safety of a vehicle.

DESCRIPTION OF EMBODIMENTS

Figure 1:
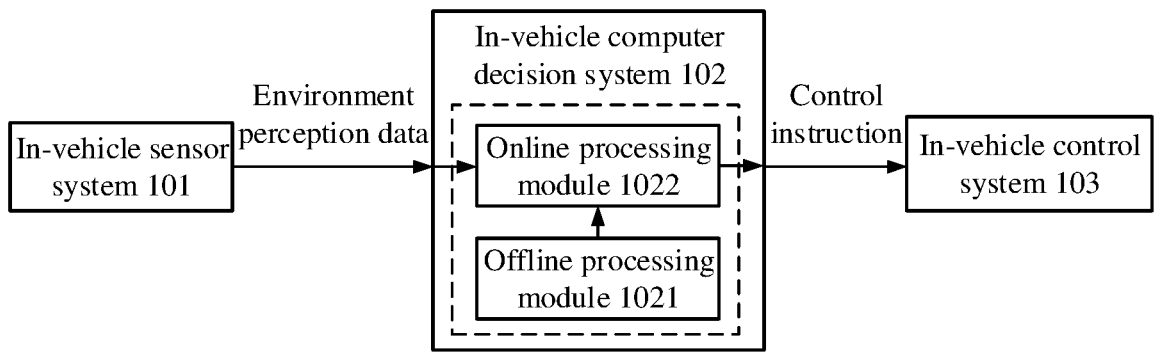
FIG. 1 is a schematic diagram of an intelligent decision control system according to an embodiment of the present disclosure.

To make the objectives, technical solutions, and advantages of this application clearer, the following further describes the implementations of this application in detail with reference to the accompanying drawings.

Terms of embodiments of the present disclosure are first described before the embodiments of the present disclosure are described in detail.

A risk field is used to indicate a potential risk in a driving environment. Field strength of the risk field is a risk degree value of the driving environment. The risk field may be obtained by adding kinetic energy fields of all moving targets and potential energy fields of all static targets in the driving environment together. Greater field strength of the risk field indicates a greater potential risk, and smaller field strength of the risk field indicates a smaller potential risk.

A kinetic energy field is used to indicate a potential risk generated by a moving target in a driving environment. Field strength of the kinetic energy field is a risk degree value generated by the moving target in the driving environment. The moving target includes a moving vehicle, a pedestrian, or the like. A magnitude and a direction that are of the field strength of the kinetic energy field of the moving target are mainly determined by an attribute (such as a type or mass) and a movement status (such as a velocity or an acceleration) of the moving target.

A potential energy field is used to indicate a potential risk generated by a static target in a driving environment. Field strength of the potential energy field is a risk degree value generated by the static target in the driving environment. The static target includes a static obstacle, a traffic sign, or the like. A magnitude and a direction that are of the field strength of the potential energy field of the static target are mainly determined by an attribute (such as a type or mass) of the static target.

Next, an application environment in the embodiments of the present disclosure is described.

With rapid development a self-driving technology and a driver assistance system, a self-driving vehicle or a vehicle that uses the driver assistance system is increasingly popular. Importance of driving intention prediction of another vehicle in a driving environment is increasingly evident in terms of intelligent decision-making of the self-driving vehicle and active safety of the vehicle that uses the driver assistance system. Accurate prediction of driving intention of another vehicle is a prerequisite for the self-driving vehicle or the vehicle that uses the driver assistance system to perform proper and safe decision control in a complex driving environment. The embodiments of the present disclosure provide a driving intention determining method, to accurately determine driving intention of another vehicle and provide a proper determining basis for a driving policy in a complex driving environment, thereby improving active safety of a vehicle.

Finally, a system architecture in the embodiments of the present disclosure is described.

FIG. 1 is a schematic diagram of an intelligent decision control system according to an embodiment of the present disclosure. Referring to FIG. 1, the intelligent decision control system may include an in-vehicle sensor system 101, an in-vehicle computer decision system 102, and an in-vehicle control system 103.

The in-vehicle sensor system 101 includes at least one in-vehicle sensor. The in-vehicle sensor system 101 may collect environment perception data using the at least one in-vehicle sensor, and transmit the collected environment perception data to the in-vehicle computer decision system 102. The in-vehicle computer decision system 102 may determine driving intention of another vehicle based on the environment perception data transmitted by the in-vehicle sensor system 101, so as to make decision control based on the driving intention, and send a control instruction to the in-vehicle control system 103. The in-vehicle control system 103 may perform a corresponding control operation based on the control instruction sent by the in-vehicle computer decision system 102, so as to implement self-driving.

In an embodiment, the in-vehicle computer decision system 102 may include an offline processing module 1021 and an online processing module 1022.

The offline processing module 1021 is configured to construct a driving intention classifier, so as to provide the online processing module 1022 with a tool for distinguishing between driving intention. The offline processing module 1021 may perform feature extraction and training on sample driving tracks that are driven by various driving intention and that are collected offline, to obtain the driving intention classifier based on a track feature.

The online processing module 1022 is configured to determine a risk field of a driving environment based on the environment perception data input by the in-vehicle sensor system 101, and determine a driving track of the other vehicle in the driving environment based on the risk field, so as to perform intelligent classification and matching on the driving track using the driving intention classifier constructed by the offline processing module 1021, and determine the driving intention of the other vehicle.

Figure 2:
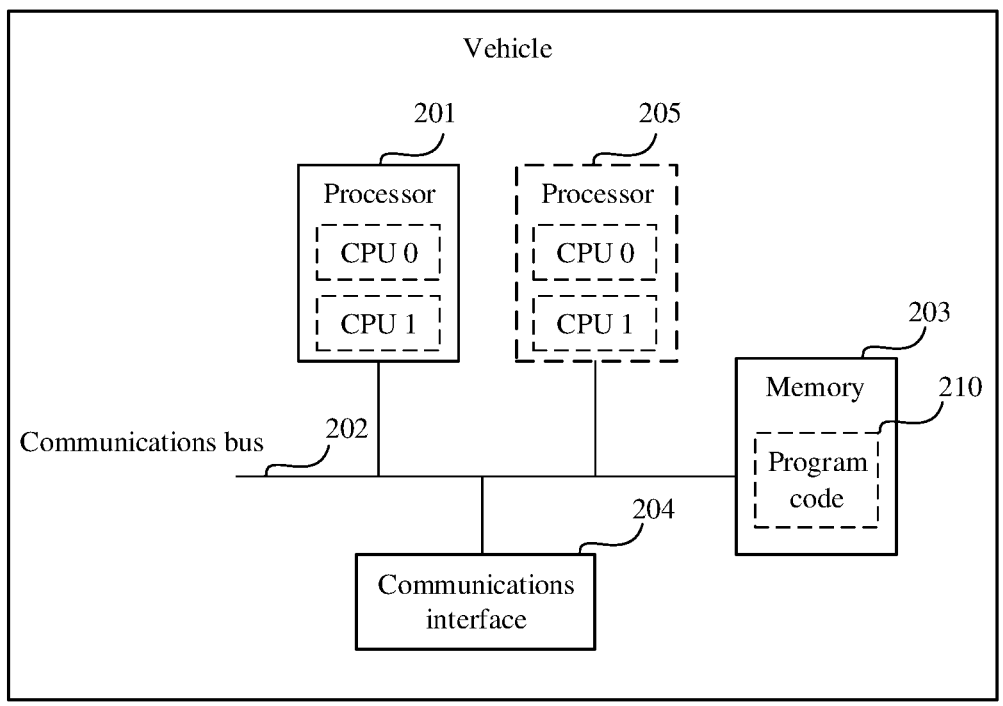
FIG. 2 is a schematic structural diagram of a vehicle according to an embodiment of the present disclosure.

FIG. 2 is a schematic structural diagram of a vehicle according to an embodiment of the present disclosure. The intelligent decision control system in FIG. 1 may be implemented using the vehicle shown in FIG. 2. Referring to FIG. 2, the vehicle includes at least one processor 201, a communications bus 202, a memory 203, and at least one communications interface 204.

The processor 201 may be a general-purpose central processing unit (CPU), a microprocessor, an application-specific integrated circuit (ASIC), or one or more integrated circuits for controlling program execution in the solutions of this application.

The communications bus 202 may include a path for transmitting information between the foregoing components.

The memory 203 may be a read-only memory (ROM) or another type of static storage device capable of storing static information and instructions, or a random access memory (RAM) or another type of dynamic storage device capable of storing information and instructions, or may be an electrically erasable programmable read-only memory (EEPROM), a compact disc read-only memory (CD-ROM) or another compact disc storage, optical disc storage (including a compressed optical disc, a laser disc, an optical disc, a digital versatile disc, a Blu-ray disc, or the like), a magnetic disk storage medium or another magnetic storage device, or any other medium capable of carrying or storing expected program code in a form of instructions or data structures and capable of being accessed by a computer, but is not limited thereto. The memory 203 may exist independently, and is connected to the processor 201 using the communications bus 202. Alternatively, the memory 203 may be integrated into the processor 201.

The communications interface 204 is an apparatus that uses any transceiver, and configured to communicate with another device or a communications network such as an Ethernet, a radio access network (RAN), or a wireless local area network (WLAN).

In specific implementation, in an embodiment, the processor 201 may include one or more CPUs, for example, a CPU 0 and a CPU 1 shown in FIG. 2.

In specific implementation, in an embodiment, the vehicle may include a plurality of processors, for example, the processor 201 and a processor 205 shown in FIG. 2. Each of the processors may be a single-core processor (single-CPU) or may be a multi-core processor (multi-CPU). The processor herein may be one or more devices, a circuit, and/or a processing core used for processing data (such as a computer program instruction).

In specific implementation, in an embodiment, the vehicle may further include an output device 206 and an input device 207. The output device 206 communicates with the processor 201, and may display information in a plurality of manners. For example, the output device 206 may be a liquid crystal display (LCD), a light emitting diode (LED) display device, a cathode ray tube (CRT) display device, or a projector. The input device 207 communicates with the processor 201, and may receive input of a user in a plurality of manners. For example, the input device 207 may be a mouse, a keyboard, a touchscreen device, or a sensing device.

The memory 203 is configured to store program code 210 used to execute the solutions in this application, data used to implement the solutions in this application, and the like. The processor 201 is configured to execute the program code 210 stored in the memory 203, to implement a driving intention determining method provided in the following embodiment of FIG. 3A.

Figure 3A:
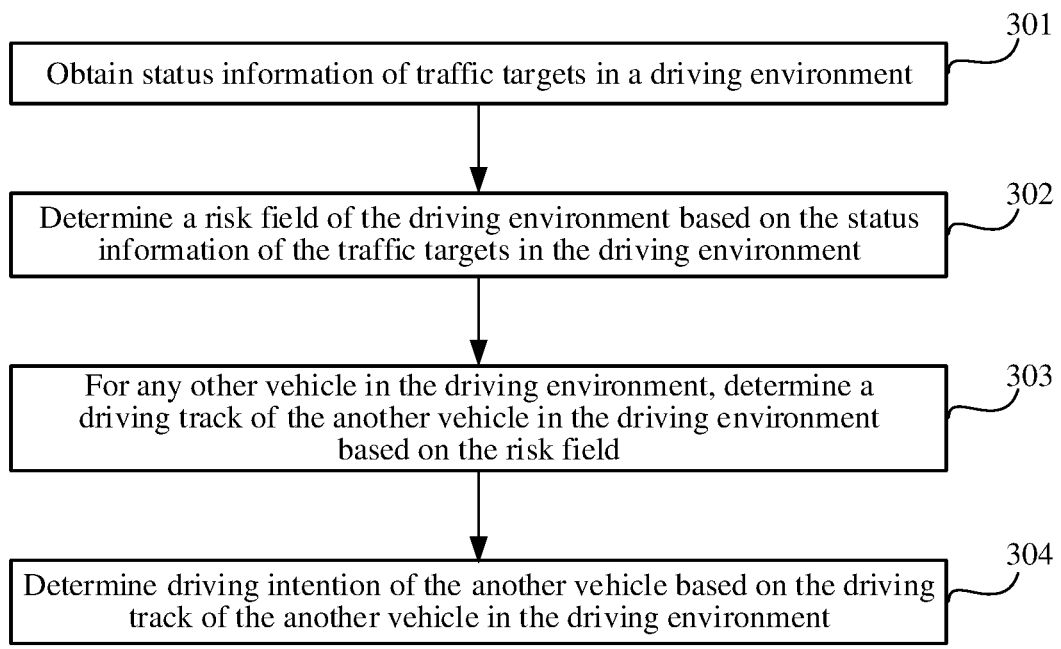
FIG. 3A is a flowchart of a driving intention determining method according to an embodiment of the present disclosure.

FIG. 3A is a flowchart of a driving intention determining method according to an embodiment of the present disclosure. The method is applied to a vehicle, and may be applied to an in-vehicle computer decision system of the vehicle. Referring to FIG. 3A, the method includes the following steps.

Step 301: Obtain status information of traffic targets in a driving environment.

In an embodiment, environment perception data and map data of the driving environment may be obtained. The environment perception data and the map data are identified and classified, to obtain the status information of the traffic targets in the driving environment.

It should be noted that the environment perception data is data collected by at least one installed in-vehicle sensor, for example, image data collected by an in-vehicle camera and point cloud data collected by laser radar. This is not limited in this embodiment of the present disclosure.

In addition, the traffic targets may include a traffic target in a moving state and traffic targets in a static state. The traffic target in a moving state may include a moving vehicle, a pedestrian, or the like. The traffic targets in a static state may include a parked vehicle, a lane line, and the like. The traffic targets in a static state may be classified into a static obstacle (such as a parked vehicle, a street tree, or a road boundary) and a traffic sign (such as a lane line or a stop line).

Further, the status information of the traffic targets is used to indicate statuses of the traffic targets, and the status information of the traffic targets is information that can affect risk degree values generated by the traffic targets. For example, status information of the traffic target in a moving state may include location information, a type, a velocity, and an acceleration of the traffic target, and status information of the traffic targets in a static state may include at least indication information of the traffic sign (for example, a type of the traffic sign) and road boundary information (for example, a size of the road boundary). This is not limited in this embodiment of the present disclosure.

Step 302: Determine a risk field of the driving environment based on the status information of the traffic targets in the driving environment.

It should be noted that field strength of the risk field is a risk degree value of the driving environment, the risk field may include a kinetic energy field and a potential energy field, and the risk field may be obtained by adding the kinetic energy field and the potential energy field together.

In an embodiment, for each traffic target in the driving environment, it is determined, based on status information of the traffic target, whether the traffic target is a traffic target in a moving state or a traffic target in a static state. When the traffic target is a traffic target in a moving state, a kinetic energy field of the traffic target is determined based on the status information of the traffic target. Field strength of the kinetic energy field of the traffic target is a risk degree value generated by the traffic target in the driving environment. When the traffic target is a traffic target in a static state, a potential energy field of the traffic target is determined based on the status information of the traffic target. Field strength of the potential energy field of the traffic target is a risk degree value generated by the traffic target in the driving environment. Kinetic energy fields of all traffic targets in a moving state in the driving environment and potential energy fields of all traffic targets in a static state in the driving environment are added together, to obtain the risk field of the driving environment.

For example, there is a traffic target 1 and a traffic target 2 in the driving environment. It is assumed that the traffic target 1 is a traffic target in a moving state, and the traffic target 2 is a traffic target in a static state. In this case, a kinetic energy field of the traffic target 1 may be determined based on status information of the traffic target 1, and a potential energy field of the traffic target 2 may be determined based on status information of the traffic target 2. It is assumed that the kinetic energy field of the traffic target 1 is $\vec{E}_D$, and the potential energy field of the traffic target 2 is $\vec{E}_S$. In this case, the kinetic energy field of the traffic target 1 and the potential energy field of the traffic target 2 may be added together to obtain the risk field of the driving environment, that is, $\vec{E}=\vec{E}_D+\vec{E}_S$.

The operation of determining, based on status information of the traffic target, whether the traffic target is a traffic target in a moving state or a traffic target in a static state may be, when a velocity included in the status information of the traffic target is not 0, determining that the traffic target is a traffic target in a moving state, and when a type included in the status information of the traffic target is a traffic sign, or when a velocity included in the status information of the traffic target is 0, determining that the traffic target is a traffic target in a static state.

When the traffic target is a traffic target in a moving state, the operation of determining a kinetic energy field of the traffic target based on the status information of the traffic target is described in detail in subsequent embodiments. Similarly, when the traffic target is a traffic target in a static state, the operation of determining a potential energy field of the traffic target based on the status information of the traffic target is also described in detail in subsequent embodiments.

In actual application, for ease of distinguishing between traffic targets, a traffic target identifier of each traffic target in a moving state in the driving environment may be stored in a moving target list, and a traffic target identifier of each traffic target in a static state in the driving environment may be stored in a static target list. Then, for each traffic target identifier stored in the moving target list, a kinetic energy field of a traffic target identified by the traffic target identifier may be determined. For each traffic target identifier stored in the static target list, a potential energy field of a traffic target identified by the traffic target identifier is determined.

It should be noted that a traffic target identifier is used to uniquely identify a traffic target. For example, the traffic target identifier may be a name of the traffic target. This is not limited in this embodiment of the present disclosure.

Step 303: For any other vehicle in the driving environment, determine a driving track of the other vehicle in the driving environment based on the risk field.

In an embodiment, a location point of the other vehicle may be used as an initial iteration point of the risk field, and iterative calculation is performed on the risk field using a gradient descent method, to obtain a plurality of iterative points. A track formed by the plurality of iteration points is determined as the driving track of the other vehicle in the driving environment.

It should be noted that the gradient descent method is an optimization algorithm, and is usually referred to as a steepest descent method. In the method, a new search direction of each iteration is determined using a negative gradient direction, so that a function value of a to-be-optimized target function can be reduced after each iteration.

In this case, the location point of the other vehicle is used as the initial iteration point of the risk field, and the plurality of iterative points obtained after iterative calculation is performed on the risk field using the gradient descent method are a plurality of location points that can reduce the field strength of the risk field at a fastest speed and that start from the location point of the other vehicle. A driver usually controls a vehicle to travel along a place at which the field strength of the risk field is weakest. The track formed by the plurality of iteration points may be extracted as the driving track of the other vehicle in the driving environment.

Step 304: Determine driving intention of the other vehicle based on the driving track of the other vehicle in the driving environment.

In an embodiment, a track feature vector corresponding to the driving track of the other vehicle in the driving environment may be determined. The driving intention of the other vehicle is determined based on the track feature vector using a driving intention classifier.

The operation of determining a track feature vector corresponding to the driving track of the other vehicle in the driving environment may be obtaining n sampling points from the driving track of the other vehicle in the driving environment, where n is a natural number greater than 1, determining n−1 track direction angles of the driving track based on coordinates of the n sampling points in the driving environment, and determining the track feature vector based on the n−1 track direction angles.

It should be noted that none of the n−1 track direction angles may be less than 0 degrees and greater than 360 degrees, and a positive direction of the n−1 track direction angles may be a counterclockwise or clockwise direction. This is not limited in this embodiment of the present disclosure. The driving track may be represented as [$\theta_1$, $\theta_2$, ..., $\theta_{n-1}$, $\theta_n$], where $\theta_1$, $\theta_2$, ..., $\theta_{n-1}$, and $\theta_n$ are the n track direction angles.

The operation of determining n−1 track direction angles of the driving track based on coordinates of the n sampling points in the driving environment may be, for each of first n−1 sampling points of the n sampling points, obtaining a direction vector from coordinates of the sampling point in the driving environment to coordinates of a next adjacent sampling point in the driving environment using a fourth formula, obtaining a target angle of the sampling point based on the direction vector using a fifth formula, and obtaining a track direction angle of the sampling point based on the target angle of the sampling point using a sixth formula.

The fourth formula is as follows:

$$\vec{e}_k = (x_{k+1} - x_k, y_{k+1} - y_k), k \in [1, n-1],$$

The fifth formula is as follows:

$$\beta_k = \begin{cases} \dfrac{\cos^{-1}(\vec{e}_k \cdot \vec{e}_0)}{|\vec{e}_k| \cdot |\vec{e}_0|} \cdot \dfrac{180}{\pi}, & y_{k+1} - y_k \geq 0 \\ \left(2\pi - \dfrac{\cos^{-1}(\vec{e}_k \cdot \vec{e}_0)}{|\vec{e}_k| \cdot |\vec{e}_0|}\right) \cdot \dfrac{180}{\pi}, & y_{k+1} - y_k < 0 \end{cases}, k \in [1, n-1].$$

The sixth formula is as follows:

$$\theta_k = \begin{cases} 360 - \beta_k, & \beta_k \geq 180 \\ \beta_k, & \beta_k < 180 \end{cases}, k \in [1, n-1].$$

$\vec{e}_k$ is a direction vector from $(x_k, y_k)$ to $(x_{k+1}, y_{k+1})$, $(x_k, y_k)$ are the coordinates of the sampling point in the driving environment, $(x_{k+1}, y_{k+1})$ are the coordinates of the next sampling point in the driving environment, $\beta_k$ is the target angle of the sampling point, $\theta_k$ is the track direction angle of the sampling point, $\vec{e}_0$ is a unit vector on a horizontal axis, and k is a location of the sampling point among the n sampling points.

Figure 3B:
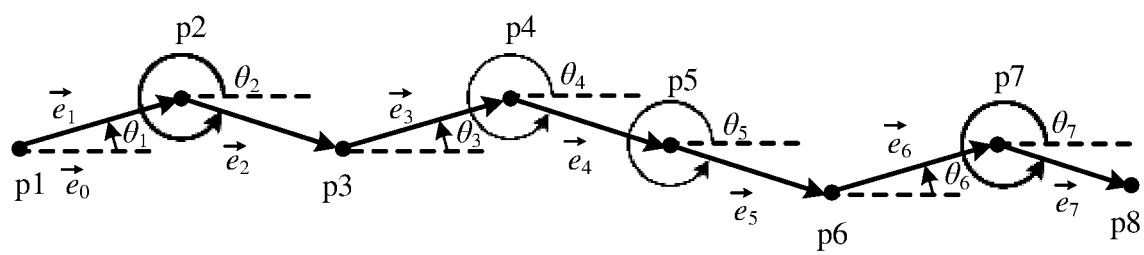
FIG. 3B is a schematic diagram of n sampling points of a driving track according to an embodiment of the present disclosure.

For example, as shown in FIG. 3B, if the n sampling points obtained from the driving track are p1, p2, p3, p4, p5, p6, p7, and p8, for the first n−1 sampling points p1, p2, p3, p4, p5, p6, and p7 of the n sampling points, a direction vector $\vec{e}_1$ from coordinates of p1 in the driving environment to coordinates of p2 in the driving environment may be determined, and a track direction angle $\theta_1$ of p1 is determined based on the direction vector $\vec{e}_1$ and the unit vector $\vec{e}_0$ on the horizontal axis. Similarly, a track direction angle $\theta_2$ of p2, . . . , and a track direction angle $\theta_7$ of p7 may be determined. Last, the following n−1 track direction angles of the driving track are obtained: $\theta_1, \theta_2, \theta_3, \theta_4, \theta_5, \theta_6$, and $\theta_7$.

When the track feature vector is determined based on the n−1 track direction angles, a plurality of feature values of the n−1 track direction angles may be used as elements of the track feature vector, to obtain the track feature vector. Certainly, the track feature vector may be determined based on the n−1 track direction angles in another manner. This is not limited in this embodiment of the present disclosure.

It should be noted that the plurality of feature values of the n−1 track direction angles may include at least one of an expected value, a standard deviation, a maximum value, a minimum value, a quantity, probability distribution, or the like of the n−1 track direction angles. This is not limited in this embodiment of the present disclosure. For example, the plurality of feature values of the n−1 track direction angles include the expected value, the standard deviation, the maximum value, and the minimum value of the n−1 track direction angles. In this case, the track feature vector may be represented as [E, D, MAX, MIN], where E is the expected value of the n−1 track direction angles, D is the standard deviation of the n−1 track direction angles, MAX is the maximum value of the n−1 track direction angles, and MIN is the minimum value of the n−1 track direction angles.

The operation of determining the driving intention of the other vehicle based on the track feature vector using a driving intention classifier may be, using the track feature vector as input of the driving intention classifier, calculating, by the driving intention classifier, a Euclidean distance between the track feature vector and each of a plurality of classification hyperplanes of the driving intention classifier, and determining, by the driving intention classifier as the driving intention of the other vehicle, driving intention corresponding to a classification hyperplane that has a minimum Euclidean distance from the track feature vector and that is of the plurality of classification hyperplanes.

Figure 3C:
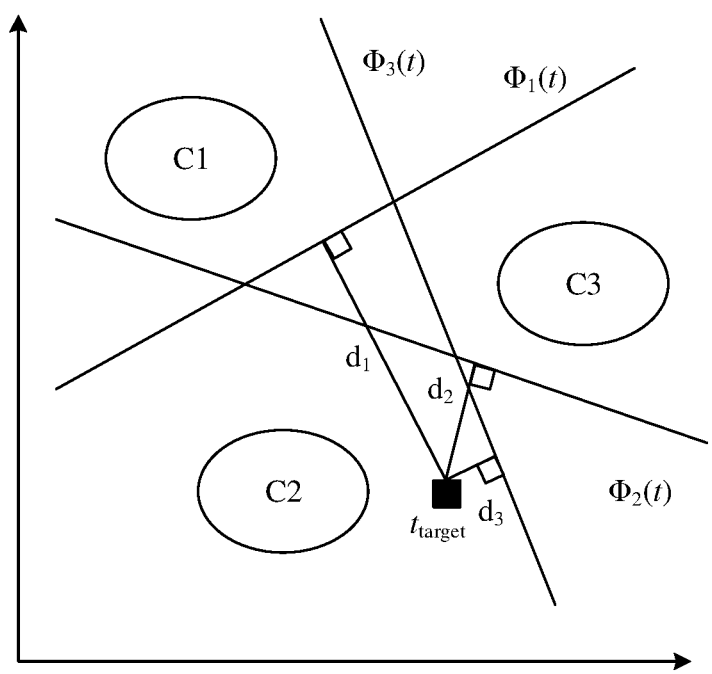
FIG. 3C is a schematic diagram of a plurality of classification hyperplanes of a driving intention classifier according to an embodiment of the present disclosure.

For example, as shown in FIG. 3C, the track feature vector is $t_{target}$, the driving intention classifier includes classification hyperplanes $\varphi_1(t)$, $\varphi_2(t)$, and $\varphi_3(t)$, and $\varphi_1(t)$, $\varphi_2(t)$, and $\varphi_3(t)$ are in a one-to-one correspondence with driving intention C1 (straight drive), C2 (left lane change), and C3 (right lane change). In this case, the driving intention classifier may calculate a Euclidean distance between $t_{target}$ and each of $\varphi_1(t)$, $\varphi_2(t)$, and $\varphi_3(t)$. It is assumed that a Euclidean distance between $t_{target}$ and $\varphi_1(t)$ is $d_1$, a Euclidean distance between $t_{target}$ and $\varphi_2(t)$ is $d_2$, and a Euclidean distance between $t_{target}$ and $\varphi_3(t)$ is $d_3$, and $d_3 < d_2 < d_1$. In this case, the driving intention C3 (right lane change) corresponding to $\varphi_3(t)$ may be determined as the driving intention of the other vehicle.

Further, before the driving intention of the other vehicle is determined based on the track feature vector using the driving intention classifier, the driving intention classifier may be further constructed. The operation of constructing the driving intention classifier is described in detail in subsequent embodiments.

In this embodiment of the present disclosure, after the status information of the traffic targets in the driving environment is obtained, the risk field of the driving environment may be determined based on the status information of the traffic targets in the driving environment. Because the field strength of the risk field is the risk degree value of the driving environment, for any other vehicle in the driving environment, the driving track of the other vehicle in the driving environment may be determined based on the risk field. Then, the driving intention of the other vehicle may be determined based on the driving track of the other vehicle in the driving environment. In this embodiment of the present disclosure, only the risk field of the driving environment needs to be constructed to determine the driving intention of the other vehicle. This greatly simplifies a driving intention determining process, thereby improving determining efficiency. In addition, the status information that is of all the traffic targets and that affects the driving intention is comprehensively considered using the risk field of the driving environment. Accuracy of the driving intention of the other vehicle determined based on the risk field is relatively high. Moreover, when the driving track and the driving intention of the other vehicle in the driving environment are effectively determined, proper decision control may be subsequently performed based on the driving track and the driving intention of the other vehicle, thereby improving active safety of a vehicle.

Figure 4A:
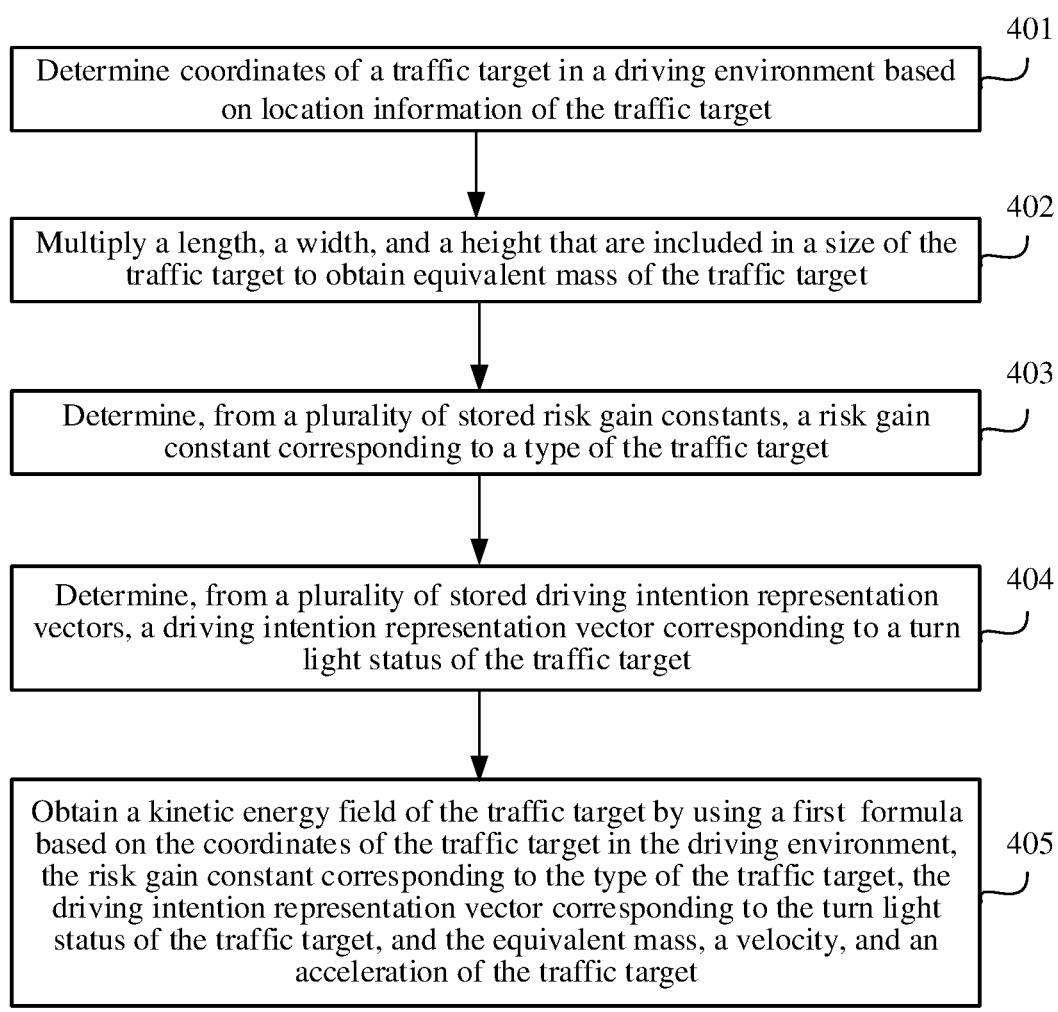
FIG. 4A is a flowchart of an operation of determining a kinetic energy field of a traffic target according to an embodiment of the present disclosure.

It should be noted that in step 302 in the foregoing embodiment of FIG. 3A, when the traffic target is a traffic target in a moving state, and the kinetic energy field of the traffic target is determined based on the status information of the traffic target, the kinetic energy field of the traffic target may be determined based on location information, a type, a size, a turn light status, a velocity, and an acceleration that are included in the status information of the traffic target. Referring to FIG. 4A, this may be implemented using the following steps 401 to 405.

Step 401: Determine coordinates of the traffic target in the driving environment based on the location information of the traffic target.

Step 402: Multiply a length, a width, and a height that are included in the size of the traffic target to obtain equivalent mass of the traffic target.

Step 403: Determine, from a plurality of stored risk gain constants, a risk gain constant corresponding to the type of the traffic target.

In an embodiment, the corresponding risk gain constant may be obtained from a stored correspondence between a moving target type and a risk gain constant based on the type of the traffic target.

It should be noted that the correspondence between a moving target type and a risk gain constant may be preset, and a risk gain constant corresponding to a moving target type is used to indicate a magnitude of a potential risk generated by a moving target of the moving target type.

Step 404: Determine, from a plurality of stored driving intention representation vectors, a driving intention representation vector corresponding to the turn light status of the traffic target.

In an embodiment, the corresponding driving intention representation vector may be obtained from a stored correspondence between a turn light status and a driving intention representation vector based on the turn light status of the traffic target.

It should be noted that a driving intention representation vector is a representation vector strongly related to driving intention, and affects a field strength direction of a kinetic energy field of a moving target.

In addition, the correspondence between a turn light status and a driving intention representation vector may be preset. For example, the correspondence between a turn light status and a driving intention representation vector may be shown in Table 1 below, where $\vec{e}_y$ is a unit vector on a vertical axis.

TABLE 1

| Turn light status | Driving intention representation vector |
|---|---|
| Left turn light is on | $-\vec{e}_y$ |
| Right turn light is on | $\vec{e}_y$ |
| Turn light is off | 0 |

In this embodiment of the present disclosure, the correspondence between a turn light status and a driving intention representation vector shown in the foregoing Table 1 is merely used as an example for description. The foregoing Table 1 constitutes no limitation to this embodiment of the present disclosure.

Step 405: Obtain the kinetic energy field of the traffic target using a first formula based on the coordinates of the traffic target in the driving environment, the risk gain constant corresponding to the type of the traffic target, the driving intention representation vector corresponding to the turn light status of the traffic target, and the equivalent mass, the velocity, and the acceleration of the traffic target.

The first formula is as follows:

$$\vec{E}_{D\_ij} = \frac{A_i M_i}{|\vec{d}_{ij}|^{\varepsilon_1}} \{[\exp[\varepsilon_2 v_{ix}\cos(\theta_{ix})] + \exp[\varepsilon_3 v_{iy}\cos(\theta_{iy})] + \exp[\varepsilon_4 a_{ix}\cos(\theta_{iax})] + \exp[\varepsilon_5 a_{iy}\cos(\theta_{iay})]\}\vec{e}_{ij} + \varepsilon_6 \vec{e}_{light}\}.$$

$\vec{E}_{D\_ij}$ is the risk degree value generated by the traffic target in the driving environment, $A_i$ is the risk gain constant corresponding to the type of the traffic target, $M_i$ is the equivalent mass of the traffic target, $\vec{d}_{ij}$ is a direction vector from $(x_i,y_i)$ to $(x_j,y_j)$, $|\vec{d}_{ij}|$ is a vector distance between $(x_i,y_i)$ and $(x_j,y_j)$, $(x_i,y_i)$ are the coordinates of the traffic target in the driving environment, $(x_j,y_j)$ are coordinates that are of any location in the driving environment and that are based on the driving environment, $\vec{e}_{ij}$ is a unit vector in the $\vec{d}_{ij}$ direction, $v_{ix}$ is a velocity component of the traffic target on a horizontal axis, $v_{iy}$ is a velocity component of the traffic target on a vertical axis, $a_{ix}$ is an acceleration component of the traffic target on the horizontal axis, $a_{iy}$ is an acceleration component of the traffic target on the vertical axis, and $\vec{e}_{light}$ is the driving intention representation vector corresponding to the turn light status of the traffic target.

$\varepsilon_1$, $\varepsilon_2$, $\varepsilon_3$, $\varepsilon_4$, $\varepsilon_5$, and $\varepsilon_6$ are all constants greater than 0, and $\varepsilon_1$, $\varepsilon_2$, $\varepsilon_3$, $\varepsilon_4$, $\varepsilon_5$, and $\varepsilon_6$ may all be preset.

$\theta_{ix}$ is an angle between the velocity component of the traffic target on the horizontal axis and $\vec{d}_{ij}$, $\theta_{iy}$ is an angle between the velocity component of the traffic target on the vertical axis and $\vec{d}_{ij}$, $\theta_{iax}$ is an angle between the acceleration component of the traffic target on the horizontal axis and $\vec{d}_{ij}$, and $\theta_{iay}$ is an angle between the acceleration component of the traffic target on the vertical axis and $\vec{d}_{ij}$. For all these angles, a positive direction may be a counterclockwise direction or a clockwise direction. This is not limited in this embodiment of the present disclosure.

A field strength direction of the kinetic energy field of the traffic target is determined by both $\vec{e}_{ij}$ and $\vec{e}_{light}$. Greater field strength of the kinetic energy field of the traffic target indicates a greater potential risk generated by the traffic target.

$\exp[\varepsilon_2 v_{ix} \cos(\theta_{ix})]+\exp[\varepsilon_3 v_{iy} \cos(\theta_{iy})]$ is used to describe a pattern that a risk degree value generated by the traffic target at any location in the driving environment varies with the velocity and a moving direction of the traffic target. When $v_{ix}$ and $v_{iy}$ are unchanged, a smaller $\theta_{ix}$ and a smaller $\theta_{iy}$ indicate a greater risk degree value generated by the traffic target at a location indicated by $(x_i,y_i)$, or a greater $\theta_{ix}$ and a greater $\theta_{iy}$ indicate a smaller risk degree value generated by the traffic target at a location indicated by $(x_i,y_i)$. Similarly, when $\theta_{ix}$ and $\theta_{iy}$ are unchanged, if $\cos(\theta_{ix})<0$, or $\cos(\theta_{iy})<0$, a greater $v_{ix}$ and a greater $v_{iy}$ indicate a smaller risk degree value generated by the traffic target at a location indicated by $(x_i,y_i)$, or if $\cos(\theta_{ix})>0$ or $\cos(\theta_{iy})>0$, a greater $v_{ix}$ and a greater $v_{iy}$ indicate a greater risk degree value generated by the traffic target at a location indicated by $(x_i,y_i)$.

$\exp[\varepsilon_4 a_{ix} \cos(\theta_{iax})]+\exp[\varepsilon_5 a_{iy} \cos(\theta_{iay})]$ is used to describe a pattern that a risk degree value generated by the traffic target at any location in the driving environment varies with the acceleration and a moving direction of the traffic target. When $a_{ix}$ and $a_{iy}$ are unchanged, a smaller $\theta_{iax}$ and a smaller $\theta_{iay}$ indicate a greater risk degree value generated by the traffic target at a location indicated by $(x_i, y_i)$, or a greater $\theta_{iax}$ and a greater $\theta_{iay}$ indicate a smaller risk degree value generated by the traffic target at a location indicated by $(x_i, y_i)$. Similarly, when $\theta_{iax}$ and $\theta_{iay}$ are unchanged, if $\cos(\theta_{iax})<0$ or $\cos(\theta_{iay})<0$, a greater $a_{ix}$ and a greater $a_{iy}$ indicate a smaller risk degree value generated by the traffic target at a location indicated by $(x_i, y_i)$, or if $\cos(\theta_{iax})>0$ or $\cos(\theta_{iay})>0$, a greater $a_{ix}$ and a greater $a_{iy}$ indicate a greater risk degree value generated by the traffic target at a location indicated by $(x_i, y_i)$.

Figure 4B:
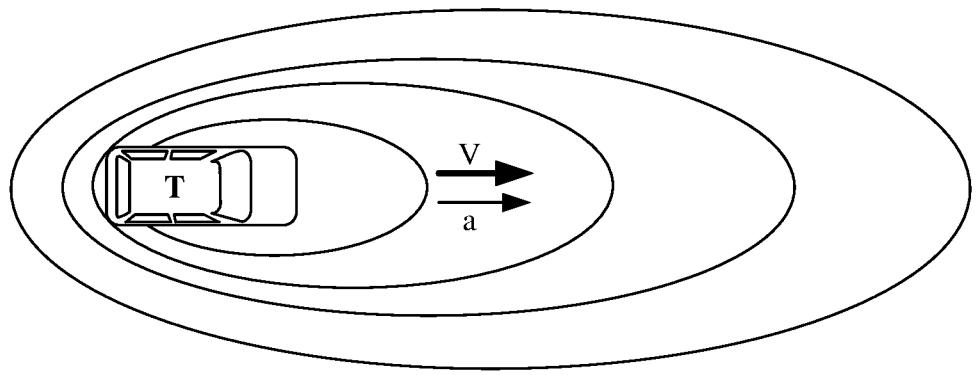
FIG. 4B is a schematic diagram of a kinetic energy field of a traffic target according to an embodiment of the present disclosure.
Figure 4C:
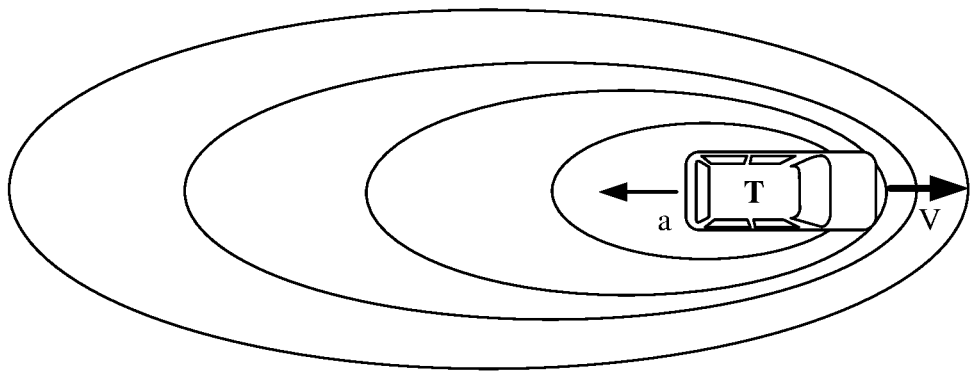
FIG. 4C is a schematic diagram of a kinetic energy field of another traffic target according to an embodiment of the present disclosure.

For example, a velocity of a traffic target T is v, a direction of v is a horizontal axis direction, and an acceleration of the traffic target is a. If a direction of a is the same as the direction of v, a kinetic energy field of the traffic target T may be shown in FIG. 4B. If a direction of a is opposite to the direction of v, a kinetic energy field of the traffic target T may be shown in FIG. 4C. The kinetic energy field of the traffic target T is represented by a plurality of rings. Increased sizes of the plurality of rings indicate gradually decreased field strength, in other words, a risk degree value gradually decreases.

It should be noted that in step 302 in the foregoing embodiment of FIG. 3A, when the traffic target is a traffic target in a static state, and the potential energy field of the traffic target is determined based on the status information of the traffic target, it may be determined, based on the status information of the traffic target, whether the traffic target is a static obstacle or a traffic sign. When the traffic target is a static obstacle, the potential energy field of the traffic target is determined based on location information and a size that are included in the status information of the traffic target. When the traffic target is a traffic sign, the potential energy field of the traffic target is determined based on location information and a type that are included in the status information of the traffic target.

The operation of determining, based on the status information of the traffic target, whether the traffic target is a static obstacle or a traffic sign may be, when the type included in the status information of the traffic target is not a traffic sign, determining that the traffic target is a static obstacle, or when the type included in the status information of the traffic target is a traffic sign, determining that the traffic target is a traffic sign.

Figure 5A:
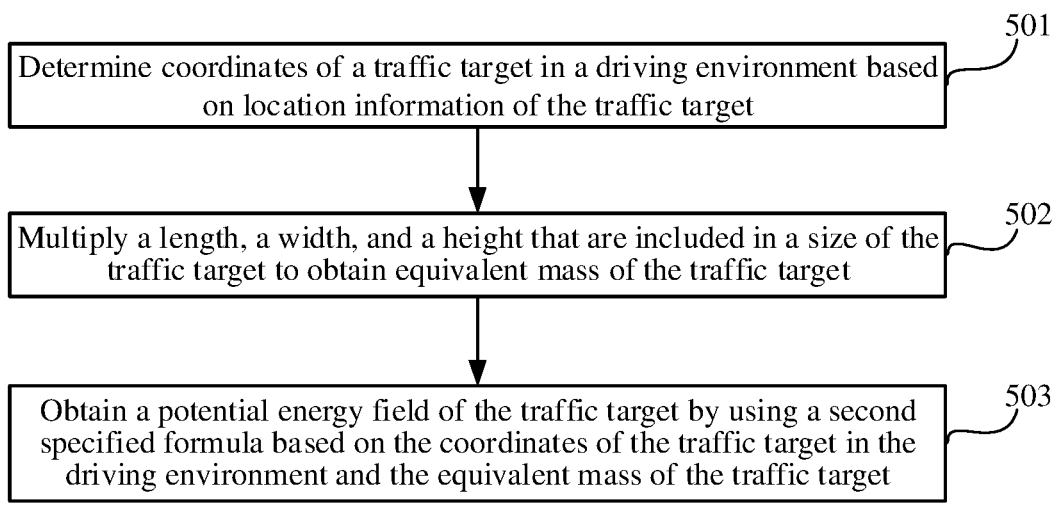
FIG. 5A is a flowchart of an operation of determining a potential energy field of a traffic target according to an embodiment of the present disclosure.

Referring to FIG. 5A, when the traffic target is a static obstacle, the operation of determining the potential energy field of the traffic target based on location information and a size that are included in the status information of the traffic target may be implemented using the following steps 501 to 503.

Step 501: Determine coordinates of the traffic target in the driving environment based on the location information of the traffic target.

Step 502: Multiply a length, a width, and a height that are included in the size of the traffic target to obtain equivalent mass of the traffic target.

Step 503: Obtain the potential energy field of the traffic target using a second formula based on the coordinates of the traffic target in the driving environment and the equivalent mass of the traffic target.

The second formula is as follows:

$$\vec{E}_{S\_ij} = \frac{M_i}{|\vec{d}_{ij}|^{\varepsilon_1}} \vec{e}_{ij}.$$

$\vec{E}_{S\_ij}$ is the risk degree value generated by the traffic target in the driving environment.

A field strength direction of the potential energy field of the traffic target is determined by $\vec{e}_{ij}$. Greater field strength of the potential energy field of the traffic target indicates a greater potential risk generated by the traffic target.

Figure 5B:
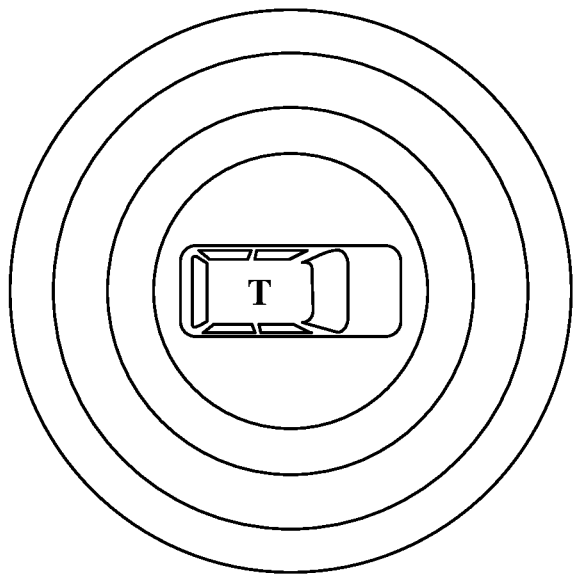
FIG. 5B is a schematic diagram of a potential energy field of a traffic target according to an embodiment of the present disclosure.

When the traffic target is a static obstacle, the potential energy field of the traffic target is related only to mass of the traffic target. In this case, risk degree values generated by the traffic target at any locations that have a same distance from the traffic target are the same. In other words, field strength distribution of the potential energy field of the traffic target is relatively even. As shown in FIG. 5B, in this case, a potential energy field of the traffic target T may be represented by a plurality of concentric circles that are centered around the traffic target T. Increased sizes of the plurality of concentric circles indicate gradually decreased field strength, in other words, the risk degree value gradually decreases.

Figure 6:
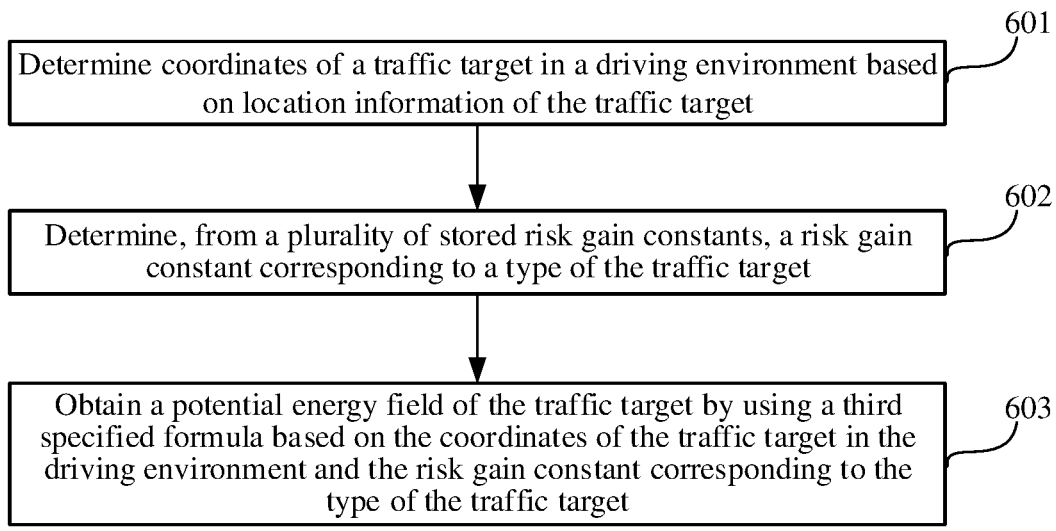
FIG. 6 is a flowchart of another operation of determining a potential energy field of a traffic target according to an embodiment of the present disclosure.

Referring to FIG. 6, when the traffic target is a traffic sign, the operation of determining the potential energy field of the traffic target based on location information and a type that are included in the status information of the traffic target may be implemented using the following steps 601 to 603.

Step 601: Determine coordinates of the traffic target in the driving environment based on the location information of the traffic target.

Step 602: Determine, from a plurality of stored risk gain constants, a risk gain constant corresponding to the type of the traffic target.

In an embodiment, the corresponding risk gain constant may be obtained from a stored correspondence between a traffic sign type and a risk gain constant based on the type of the traffic target.

It should be noted that the correspondence between a traffic sign type and a risk gain constant may be preset, and a risk gain constant corresponding to a traffic sign type is used to indicate a magnitude of a potential risk generated by a traffic sign of the traffic sign type.

For a traffic sign with a specific semantic meaning, for example, a stop line, a potential energy field of the traffic sign is related to an actual road environment. For example, when a red light is on, the stop line has a potential energy field, or when a green light is on, the stop line has no potential energy field. For a traffic sign with no semantic meaning, for example, a solid double yellow line, a dashed yellow line, a solid white line, or a dashed white line, the traffic sign always has a potential energy field. In this case, for the traffic sign with a specific semantic meaning, the traffic sign may be associated with the actual road environment. For example, for a stop line, a risk gain constant corresponding to the stop line is obtained when a red light is on, or a risk gain constant corresponding to the stop line is directly determined as 0 when a green light is on. For the traffic sign with no semantic meaning, a risk gain constant corresponding to the traffic sign is directly obtained.

Step 603: Obtain the potential energy field of the traffic target using a third formula based on the coordinates of the traffic target in the driving environment and the risk gain constant corresponding to the type of the traffic target.

The third formula is as follows:

$$\vec{E}_{T\_ij} = \frac{B_i}{|\vec{d}_{ij}|^{\varepsilon_1}} \vec{e}_{ij}.$$

$\vec{E}_{T\_ij}$ is the risk degree value generated by the traffic target in the driving environment.

A field strength direction of the potential energy field of the traffic target is determined by $\vec{e}_{ij}$. Greater field strength of the potential energy field of the traffic target indicates a greater potential risk generated by the traffic target.

Figure 7:
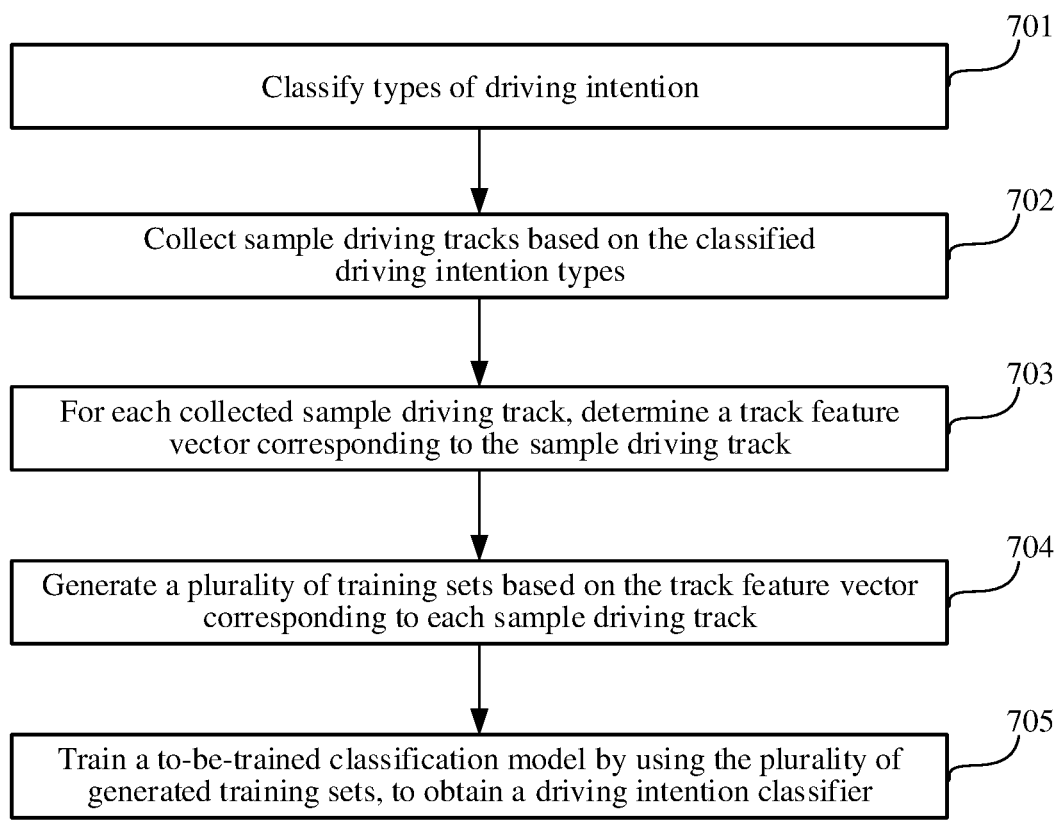
FIG. 7 is a flowchart of an operation of constructing a driving intention classifier according to an embodiment of the present disclosure.

It should be noted that referring to FIG. 7, the operation of constructing the driving intention classifier in step 304 in the foregoing embodiment of FIG. 3A may be implemented using the following steps 701 to 705.

Step 701: Classify types of driving intention.

For example, driving intention may be classified into three types, left lane change, right lane change, and straight drive. Certainly, the driving intention may alternatively be classified into other types. This is not limited in this embodiment of the present disclosure.

Step 702: Collect sample driving tracks based on the classified driving intention types.

In an embodiment, a plurality of sample driving tracks corresponding to each of the driving intention types may be collected based on the classified driving intention type, and a driving intention type corresponding to each sample driving track is marked on the collected driving track.

Step 703: For each collected sample driving track, determine a track feature vector corresponding to the sample driving track.

It should be noted that the operation of determining a track feature vector corresponding to the sample driving track is similar to the operation of determining a track feature vector corresponding to the driving track of the other vehicle in the driving environment in step 304 in the foregoing embodiment of FIG. 3A. Details are not described again in this embodiment of the present disclosure.

Step 704: Generate a plurality of training sets based on the track feature vector corresponding to each sample driving track.

In an embodiment, track feature vectors corresponding to sample driving tracks marked with a same driving intention type may be grouped into one training set, and the training set is marked with the driving intention type.

Step 705: Train a to-be-trained classification model using the plurality of generated training sets, to obtain the driving intention classifier.

It should be noted that after a driving track is input into the driving intention classifier, the driving intention classifier may output one piece of driving intention, and the output driving intention is driving intention corresponding to the driving track.

For example, it is assumed that the plurality of training sets are S1, S2, and S3, and the to-be-trained classification model is a support vector machine (Support Vector Machine, SVM). In this case, first, S1 may be used as a positive set, S2 and S3 are used as negative sets, and S1, S2, and S3 are input into an SVM training algorithm, to obtain a classification hyperplane $\varphi_1(t)$. Then, S2 is used as a positive set, S1 and S3 are used as negative sets, and S1, S2, and S3 are input into the SVM training algorithm, to obtain a classification hyperplane $\varphi_2(t)$. Finally, S3 is used as a positive set, S1 and S2 are used as negative sets, and S1, S2, and S3 are input into the SVM training algorithm, to obtain a classification hyperplane $\varphi_3(t)$. In this way, the driving intention classifier can be obtained.

Figure 8:
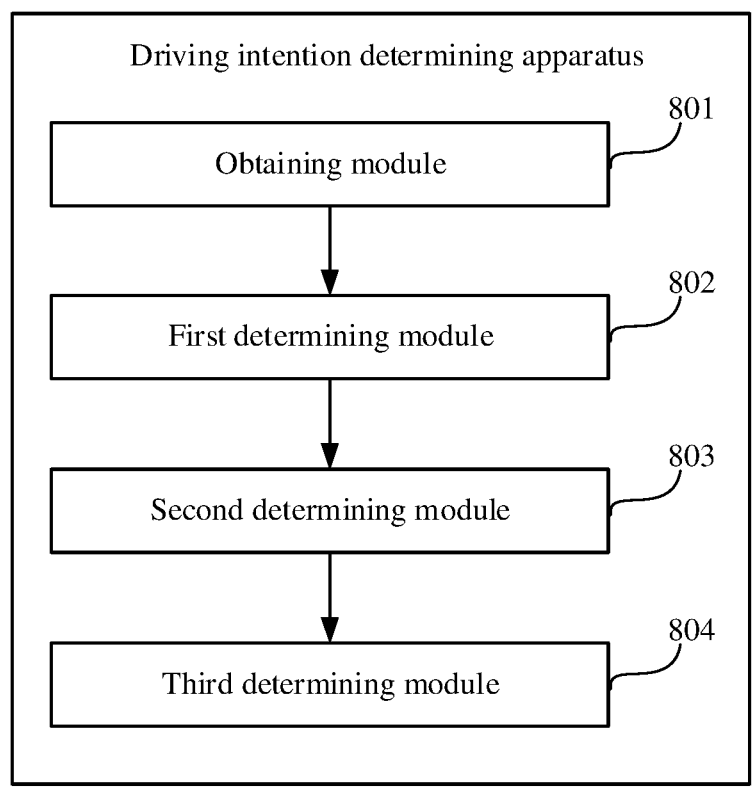
FIG. 8 is a schematic structural diagram of a driving intention determining apparatus according to an embodiment of the present disclosure.

FIG. 8 is a schematic structural diagram of a driving intention determining apparatus according to an embodiment of the present disclosure. The driving intention determining apparatus may be implemented as a part or all of a vehicle using software, hardware, or a combination thereof.

The driving intention determining apparatus may be presented in a form of a function module, and the driving intention determining apparatus may be in the form shown in FIG. 2. In this case, all function modules of the driving intention determining apparatus may be implemented using the processor and the memory in FIG. 2. The processor can execute or control another component to complete the steps of the method procedures in the embodiments of the present disclosure, so as to implement various functions.

Referring to FIG. 8, the apparatus includes an obtaining module 801, a first determining module 802, a second determining module 803, and a third determining module 804.

The obtaining module 801 is configured to obtain status information of traffic targets in a driving environment, where the traffic targets include a traffic target in a moving state and traffic targets in a static state, and status information of the traffic targets in a static state includes at least indication information of a traffic sign and road boundary information.

The first determining module 802 is configured to determine a risk field of the driving environment based on the status information of the traffic targets in the driving environment, where field strength of the risk field is a risk degree value of the driving environment, the risk field includes a kinetic energy field and a potential energy field, a kinetic energy field of the traffic target is obtained using a first formula based on coordinates of the traffic target in the driving environment, a risk gain constant corresponding to a type of the traffic target, a driving intention representation vector corresponding to a turn light status of the traffic target, and equivalent mass, a velocity, and an acceleration of the traffic target.

The first formula is as follows:

$$\vec{E}_{D\_ij} = \frac{A_i M_i}{|\vec{d}_{ij}|^{\varepsilon_1}} \{\{\exp[\varepsilon_2 v_{ix}\cos(\theta_{ix})] + \exp[\varepsilon_3 v_{iy}\cos(\theta_{iy})] + \exp[\varepsilon_4 a_{ix}\cos(\theta_{iax})] + \exp[\varepsilon_5 a_{iy}\cos(\theta_{iay})]\}\vec{e}_{ij} + \varepsilon_6 \vec{e}_{light}\}.$$

$\vec{E}_{D\_ij}$ is a risk degree value generated by the traffic target in the driving environment, $A_i$ is the risk gain constant corresponding to the type of the traffic target, $M_i$ is the equivalent mass of the traffic target, $\vec{d}_{ij}$ is a direction vector from $(x_i, y_i)$ to $(x_j, y_j)$, $(x_i, y_i)$ are the coordinates of the traffic target in the driving environment, $(x_j, y_j)$ are coordinates that are of any location in the driving environment and that are based on the driving environment, $\vec{e}_{ij}$ is a unit vector in the $\vec{d}_{ij}$ direction, $v_{ix}$ is a velocity component of the traffic target on a horizontal axis, $v_{iy}$ is a velocity component of the traffic target on a vertical axis, $a_{ix}$ is an acceleration component of the traffic target on the horizontal axis, $a_{iy}$ is an acceleration component of the traffic target on the vertical axis, $\theta_{ix}$ is an angle between the velocity component of the traffic target on the horizontal axis and $\vec{e}_{ij}$, $\theta_{iy}$ is an angle between the velocity component of the traffic target on the vertical axis and $\vec{d}_{ij}$, $\theta_{iax}$ is an angle between the acceleration component of the traffic target on the horizontal axis and $\vec{d}_{ij}$, $\theta_{iay}$ is an angle between the acceleration component of the traffic target on the vertical axis and $\vec{d}_{ij}$, $\vec{e}_{light}$ is the driving intention representation vector corresponding to the turn light status of the traffic target, and $\varphi_1$, $\varphi_2$, $\varphi_3$, $\varphi_4$, $\varphi_5$, and $\varphi_6$ are all constants greater than 0.

The second determining module 803 is configured to perform step 303 in the foregoing embodiment of FIG. 3A.

The third determining module 804 is configured to perform step 304 in the foregoing embodiment of FIG. 3A.

Optionally, the first determining module 802 includes, a judgment unit, configured to, for each traffic target, determine, based on status information of the traffic target, whether the traffic target is a traffic target in a moving state or a traffic target in a static state, a first determining unit, configured to, when the traffic target is a traffic target in a moving state, determine a kinetic energy field of the traffic target based on the status information of the traffic target, where field strength of the kinetic energy field of the traffic target is a risk degree value generated by the traffic target in the driving environment, a second determining unit, configured to, when the traffic target is a traffic target in a static state, determine a potential energy field of the traffic target based on the status information of the traffic target, where field strength of the potential energy field of the traffic target is a risk degree value generated by the traffic target in the driving environment, and an adding unit, configured to add kinetic energy fields of all traffic targets in a moving state and potential energy fields of all traffic targets in a static state in the driving environment together, to obtain the risk field of the driving environment.

Optionally, the second determining unit includes a judgment subunit, configured to determine, based on the status information of the traffic target, whether the traffic target is a static obstacle or a traffic sign, a first determining subunit, configured to, when the traffic target is a static obstacle, determine the potential energy field of the traffic target based on location information and a size that are included in the status information of the traffic target, and a second determining subunit, configured to, when the traffic target is a traffic sign, determine the potential energy field of the traffic target based on location information and a type that are included in the status information of the traffic target.

Optionally, the first determining subunit is configured to perform steps 501 to 503 in the foregoing embodiment of FIG. 3A.

Optionally, the second determining subunit is configured to perform steps 601 to 603 in the foregoing embodiment of FIG. 3A.

Optionally, the second determining module 803 includes a calculation unit, configured to use a location point of another vehicle as an initial iteration point of the risk field, and perform iterative calculation on the risk field using a gradient descent method, to obtain a plurality of iterative points, and a third determining unit, configured to determine a track formed by the plurality of iteration points as a driving track of the other vehicle in the driving environment.

Optionally, the third determining module 804 includes a fourth determining unit, configured to determine a track feature vector corresponding to the driving track of the other vehicle in the driving environment, and a fifth determining unit, configured to determine driving intention of the other vehicle based on the track feature vector using a driving intention classifier.

Optionally, the fourth determining unit includes an obtaining subunit, configured to obtain n sampling points from the driving track of the other vehicle in the driving environment, where n is a natural number greater than 1, a third determining subunit, configured to determine n−1 track direction angles of the driving track based on coordinates of the n sampling points in the driving environment, and a fourth determining subunit, configured to determine the track feature vector based on the n−1 track direction angles.

In this embodiment of the present disclosure, after the status information of the traffic targets in the driving environment is obtained, the risk field of the driving environment may be determined based on the status information of the traffic targets in the driving environment. Because the field strength of the risk field is the risk degree value of the driving environment, for any other vehicle in the driving environment, the driving track of the other vehicle in the driving environment may be determined based on the risk field. Then, the driving intention of the other vehicle may be determined based on the driving track of the other vehicle in the driving environment. In this embodiment of the present disclosure, only the risk field of the driving environment needs to be constructed to determine the driving intention of the other vehicle. This greatly simplifies a driving intention determining process, thereby improving determining efficiency. In addition, the status information that is of all the traffic targets and that affects the driving intention is comprehensively considered using the risk field of the driving environment. Accuracy of the driving intention of the other vehicle determined based on the risk field is relatively high. Moreover, when the driving track and the driving intention of the other vehicle in the driving environment are effectively determined, proper decision control may be subsequently performed based on the driving track and the driving intention of the other vehicle, thereby improving active safety of a vehicle.

It should be noted that when the driving intention determining apparatus provided in the foregoing embodiment determines driving intention, division of the foregoing function modules is used only as an example for description. In actual application, the foregoing functions may be allocated to different function modules and implemented based on a requirement, that is, an internal structure of the apparatus is divided into different function modules for implementing all or some of the functions described above. In addition, the driving intention determining apparatus provided in the foregoing embodiment and the driving intention determining method embodiment have a same concept. For a specific implementation process of the driving intention determining apparatus, refer to the method embodiment. Details are not described herein again.

All or some of the foregoing embodiments may be implemented using software, hardware, firmware, or any combination thereof. When software is used to implement the embodiments, all or some of the embodiments may be implemented in a form of a computer program product. The computer program product includes one or more computer instructions. When the computer instructions are loaded and executed on the computer, all or some of the procedures or functions according to the embodiments of the present disclosure are generated. The computer may be a general-purpose computer, a dedicated computer, a computer network, or other programmable apparatuses. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD), a semiconductor medium (for example, a solid-state drive (SSD)), or the like.

The foregoing descriptions are merely embodiments of this application, but are not intended to limit this application. Any modification, equivalent replacement, or improvement made without departing from the spirit and principle of this application shall fall within the protection scope of this application.

What is claimed is:

1. A method, comprising:
obtaining status information of a plurality of traffic targets in a driving environment, wherein the traffic targets comprise a traffic target in a moving state and a traffic target in a static state, wherein the status information of the traffic targets comprise status information of the traffic target in the moving state and status information of the traffic target in the static state, wherein the status information of the traffic target in the static state comprises at least one of indication information of a traffic sign or road boundary information;
determining a risk field of the driving environment based on the status information of the traffic targets, wherein a field strength of the risk field is a risk degree value of the driving environment, and wherein the risk field comprises a kinetic energy field and a potential energy field;
obtaining a kinetic energy field of a traffic target of the traffic targets using a first formula based on coordinates of the traffic target, a risk gain constant corresponding to a type of the traffic target, a driving intention representation vector corresponding to a turn light status of the traffic target, an equivalent mass of the traffic target, a velocity of the traffic target, and an acceleration of the traffic target, wherein the first formula is as follows:

$$\vec{E}_{D\_ij} = \frac{A_i M_i}{|\vec{d}_{ij}|^{\varepsilon_1}}\{[\exp[\varepsilon_2 v_{ix}\cos(\theta_{ix})] + \exp[\varepsilon_3 v_{iy}\cos(\theta_{iy})] + \exp[\varepsilon_4 a_{ix}\cos(\theta_{iax})] + \exp[\varepsilon_5 a_{iy}\cos(\theta_{iay})]\}\vec{e}_{ij} + \varepsilon_6 \vec{e}_{light}\},$$

wherein $\vec{E}_{D\_ij}$ is a risk degree value generated by the traffic target in the driving environment, $A_i$ is the risk gain constant corresponding to the type of the traffic target, $M_i$ is the equivalent mass of the traffic target, $\vec{d}_{ij}$ is a direction vector from $(x_i,y_i)$ to $(x_j,y_j)$, $(x_i,y_i)$ represent coordinates of the traffic target, $(x_j,y_j)$ represent coordinates of a location in the driving environment based on the driving environment, $\vec{e}_{ij}$ is a unit vector in the $\vec{d}_{ij}$ direction, $v_{ix}$ is a velocity component of the traffic target on a horizontal axis, $v_{iy}$ is a velocity component of the traffic target on a vertical axis, $a_{ix}$ is an acceleration component of the traffic target on the horizontal axis, $a_{iy}$ is an acceleration component of the traffic target on the vertical axis, $\theta_{ix}$ is an angle between the velocity component of the traffic target on the horizontal axis and $\vec{d}_{ij}$, $\theta_{iy}$ is an angle between the velocity component of the traffic target on the vertical axis and $\vec{d}_{ij}$, $\theta_{iax}$ is an angle between the acceleration component of the traffic target on the horizontal axis and $\vec{d}_{ij}$; $\theta_{iay}$ is an angle between the acceleration component of the traffic target on the vertical axis and $\vec{d}_{ij}$, $\vec{e}_{light}$ is the driving intention representation vector corresponding to the turn light status of the traffic target, and $\varepsilon_1$, $\varepsilon_2$, $\varepsilon_3$, $\varepsilon_4$, $\varepsilon_5$, and $\varepsilon_6$ are all constants greater than 0;
determining a driving track of another vehicle in the driving environment based on the risk field; and
determining a driving intention of the other vehicle based on the driving track of the other vehicle in the driving environment.

2. The method according to claim 1, wherein the determining the risk field of the driving environment based on the status information of the traffic targets comprises:
determining whether the traffic target is the traffic target in the moving state or the traffic target in the static state based on status information of each of the traffic targets for each of the traffic targets in the driving environment;
determining a potential energy field of the traffic target in the static state based on the status information of the traffic target in the static state, wherein field strength of the potential energy field of the traffic target in the static state is a risk degree value; and
adding kinetic energy fields of all traffic targets in the moving state and potential energy fields of all traffic targets in the static state in the driving environment together to obtain the risk field of the driving environment.

3. The method according to claim 2, wherein determining the potential energy field of the traffic target in the static state based on the status information of the traffic target in the static state comprises:
determining whether the traffic target in the static state is a static obstacle or a traffic sign based on the status information of the traffic target in the static state; and
determining the potential energy field of the traffic target in the static state based on location information and a size included in the status information of the traffic target in the static state when the traffic target is the static obstacle; and
determining the potential energy field of the traffic target in the static state based on the location information and a type included in the status information of the traffic target in the static state when the traffic target is the traffic sign.

4. The method according to claim 3, wherein determining the potential energy field of the traffic target in the static state based on the location information and the size included in the status information of the traffic target in the static state comprises:
determining coordinates of the traffic target in the static state in the driving environment based on the location information of the traffic target in the static state;
multiplying a length, a width, and a height indicated in the size of the traffic target in the static state to obtain the equivalent mass of the traffic target in the static state; and
obtaining the potential energy field of the traffic target in the static state using a second formula based on the coordinates of the traffic target in the static state in the driving environment and the equivalent mass of the traffic target in the static state, wherein the second formula is as follows:

$$\vec{E}_{S\_ij} = \frac{M_i}{|\vec{d}_{ij}|^{\varepsilon_1}} \vec{e}_{ij},$$

wherein $\vec{E}_{s\_ij}$ is the risk degree value, $M_i$ is the equivalent mass of the traffic target in the static state, $\vec{d}_{ij}$ is the direction vector from $(x_i,y_i)$ to $(x_j,y_j)$, $(x_i,y_i)$ represent the coordinates of the traffic target in the static state in the driving environment, $(x_j,y_j)$ represent the coordinates of the location in the driving environment based on the driving environment, $\vec{e}_{ij}$ is the unit vector in the $\vec{d}_{ij}$ direction, and $\varepsilon_1$ is a constant greater than 0.

5. The method according to claim 3, wherein determining the potential energy field of the traffic target in the static state based on the location information and the type included in the status information of the traffic target in the static state comprises:
   determining coordinates of the traffic target in the static state in the driving environment based on the location information of the traffic target in the static state;
   determining a risk gain constant corresponding to the type of the traffic target in the static state from a plurality of stored risk gain constants; and
   obtaining the potential energy field of the traffic target in the static state from a plurality of stored risk gain constants using a third formula based on the coordinates of the traffic target in the static state from a plurality of stored risk gain constants in the driving environment and the risk gain constant corresponding to the type of the traffic target from a plurality of stored risk gain constants, wherein the third formula is as follows:

$$\vec{E}_{T\_ij} = \frac{B_i}{|\vec{d}_{ij}|^{\varepsilon_1}} \vec{e}_{ij}.$$

wherein $\vec{E}_{T\_ij}$ is the risk degree value, $B_i$ is the risk gain constant corresponding to the type of the traffic target in the static state, $\vec{d}_{ij}$ is the direction vector from $(x_i,y_i)$ to $(x_j,y_j)$, $(x_i,y_i)$ represent the coordinates of the traffic target in the static state in the driving environment, $(x_j,y_j)$ represent the coordinates of the location in the driving environment based on the driving environment, $\vec{e}_{ij}$ is the unit vector in the $\vec{d}_{ij}$ direction, and $\varepsilon_1$ is a constant greater than 0.

6. The method according to claim 1, wherein determining driving track of the other vehicle in the driving environment based on the risk field comprises:
   using a location point of the other vehicle as an initial iteration point of the risk field;
   performing iterative calculation on the risk field using a gradient descent method to obtain a plurality of iterative points; and
   determining a track formed by the plurality of iteration points as the driving track of the other vehicle in the driving environment.

7. The method according to claim 1, wherein determining the driving intention of the other vehicle based on the driving track of the other vehicle in the driving environment comprises:

determining a track feature vector corresponding to the driving track of the other vehicle in the driving environment; and
determining the driving intention of the other vehicle based on the track feature vector using a driving intention classifier.

8. The method according to claim 7, wherein determining the track feature vector corresponding to the driving track of the other vehicle in the driving environment comprises:
   obtaining n sampling points from the driving track of the other vehicle in the driving environment, wherein n is a natural number greater than 1;
   determining n−1 track direction angles of the driving track based on coordinates of the n sampling points in the driving environment; and
   determining the track feature vector based on the n−1 track direction angles.

9. The method according to claim 1, wherein the determining the risk field of the driving environment based on the status information of the traffic targets comprises:
   determining whether the traffic target is the traffic target in the moving state or the traffic target in the static state based on status information of each of the traffic targets for each of the traffic targets in the driving environment;
   determining a kinetic energy field of the traffic target in the moving state based on the status information of the traffic target in the moving state when the traffic target is in the moving state, wherein a field strength of the kinetic energy field of the traffic target in the moving state is the risk degree value; and
   adding kinetic energy fields of all traffic targets in the moving state and potential energy fields of all traffic targets in the static state in the driving environment together to obtain the risk field of the driving environment.

10. The method according to claim 1, further comprising obtaining environment perception data and map data of the driving environment.

11. An apparatus, comprising:
   a memory configured to store instructions; and
   a processor coupled to the memory and configured to execute the instructions, which when executed, cause the processor to be configured to:
      obtain status information of a plurality of traffic targets in a driving environment, wherein the traffic targets comprise a traffic target in a moving state and a traffic target in a static state, wherein the status information of the traffic targets comprise status information of the traffic target in the moving state and status information of the traffic target in the static state, wherein the status information of the traffic target in the static state comprises at least one of indication information of a traffic sign or road boundary information;
      determine a risk field of the driving environment based on the status information of the traffic targets, wherein a field strength of the risk field is a risk degree value of the driving environment, and wherein the risk field comprises a kinetic energy field and a potential energy field;
      obtain a kinetic energy field of a traffic target of the traffic targets using a first formula based on coordinates of the traffic target, a risk gain constant corresponding to a type of the traffic target in the moving state, a driving intention representation vector corresponding to a turn light status of the traffic target, and equivalent mass of the traffic target, a velocity of the traffic target, and an acceleration of the traffic target, wherein the first formula is as follows:

$$\vec{E}_{D\_ij} = \frac{A_i M_i}{|\vec{d}_{ij}|^{\varepsilon_1}} \{[\exp[\varepsilon_2 v_{ix}\cos(\theta_{ix})] + \exp[\varepsilon_3 v_{iy}\cos(\theta_{iy})] + \exp[\varepsilon_4 a_{ix}\cos(\theta_{iax})] + \exp[\varepsilon_5 a_{iy}\cos(\theta_{iay})]]\vec{e}_{ij} + \varepsilon_6 \vec{e}_{light}\},$$

wherein $\vec{E}_{D\_ij}$ is a risk degree value generated by the traffic target, $A_i$ is the risk gain constant corresponding to the type of the traffic target, $M_i$ is the equivalent mass of the traffic target, $\vec{d}_{ij}$ is a direction vector from $(x_i,y_i)$ to $(x_j,y_j)$, $(x_i,y_i)$ represent coordinates of the traffic target in the driving environment, $(x_j,y_j)$ represent coordinates of a location in the driving environment based on the driving environment, $\vec{e}_{ij}$ is a unit vector in the $\vec{d}_{ij}$ direction, $v_{ix}$ is a velocity component of the traffic target on a horizontal axis, $v_{iy}$ is a velocity component of the traffic target on a vertical axis, $a_{ix}$ is an acceleration component of the traffic target on the horizontal axis, $a_{iy}$ is an acceleration component of the traffic target on the vertical axis, $\theta_{ix}$ is an angle between the velocity component of the traffic target on the horizontal axis and $\vec{d}_{ij}$, $\theta_{iy}$ is an angle between the velocity component of the traffic target on the vertical axis and $\vec{d}_{ij}$, $\theta_{iax}$ is an angle between the acceleration component of the traffic target on the horizontal axis and $\vec{d}_{ij}$, $\theta_{iay}$ is an angle between the acceleration component of the traffic target on the vertical axis and $\vec{d}_{ij}$, $\vec{e}_{light}$ is the driving intention representation vector corresponding to the turn light status of the traffic target, and $\varepsilon_1$, $\varepsilon_2$, $\varepsilon_3$, $\varepsilon_4$, $\varepsilon_5$, and $\varepsilon_6$ are all constants greater than 0;

determine a driving track of another vehicle in the driving environment based on the risk field; and determine a driving intention of the other vehicle based on the driving track of the other vehicle in the driving environment.

12. The apparatus according to claim 11, wherein the instructions further cause the processor to be configured to:

determine whether the traffic target is the traffic target in the moving state or the traffic target in the static state based on status information of each of the traffic targets for each of the traffic targets in the driving environment;

determine a potential energy field of the traffic target in the static state based on the status information of the traffic target in the static state, wherein field strength of the potential energy field of the traffic target in the static state is a risk degree value; and add kinetic energy fields of all traffic targets in the moving state and potential energy fields of all traffic targets in the static state in the driving environment together to obtain the risk field of the driving environment.

13. The apparatus according to claim 12, wherein the instructions further cause the processor to be configured to:

determine whether the traffic target in the static state is a static obstacle or a traffic sign based on the status information of the traffic target in the static state;

determine the potential energy field of the traffic target in the static state based on location information and a size included in the status information of the traffic target in the static state when the traffic target is the static obstacle; and determine the potential energy field of the traffic target in the static state based on the location information and a type included in the status information of the traffic target in the static state when the traffic target is the traffic sign.

14. The apparatus according to claim 13, wherein the instructions further cause the processor to be configured to:

determine coordinates of the traffic target in the static state in the driving environment based on the location information of the traffic target in the static state;

multiply a length, a width, and a height indicated in the size of the traffic target in the static state to obtain the equivalent mass of the traffic target in the static state; and obtain the potential energy field of the traffic target in the static state using a second formula based on the coordinates of the traffic target in the static state in the driving environment and the equivalent mass of the traffic target in the static state, wherein the second formula is as follows:

$$\vec{E}_{S\_ij} = \frac{M_i}{|\vec{d}_{ij}|^{\varepsilon_1}} \vec{e}_{ij},$$

wherein $\vec{E}_{S\_ij}$ is the risk degree value, $M_i$ is the equivalent mass of the traffic target in the static state, $\vec{d}_{ij}$ is the direction vector from $(x_i,y_i)$ to $(x_j,y_j)$, $(x_i,y_i)$ represent the coordinates of the traffic target in the static state in the driving environment, $(x_j,y_j)$ represent the coordinates of the location in the driving environment based on the driving environment, $\vec{e}_{ij}$ is the unit vector in the $\vec{d}_{ij}$ direction, and $\varepsilon_1$ is a constant greater than 0.

15. The apparatus according to claim 13, wherein the instructions further cause the processor to be configured to:

determine coordinates of the traffic target in the static state in the driving environment based on the location information of the traffic target in the static state;

determine a risk gain constant corresponding to the type of the traffic target in the static state from a plurality of stored risk gain constants; and obtain the potential energy field of the traffic target in the static state from a plurality of stored risk gain constants using a third formula based on the coordinates of the traffic target in the static state from a plurality of stored risk gain constants in the driving environment and the risk gain constant corresponding to the type of the traffic target from a plurality of stored risk gain constants, wherein the third formula is as follows:

$$\vec{E}_{T\_ij} = \frac{B_i}{|\vec{d}_{ij}|^{\varepsilon_1}} \vec{e}_{ij},$$

wherein $\vec{E}_{T\_ij}$ the risk degree value, $B_i$ is the risk gain constant corresponding to the type of the traffic target in the static state, $\vec{d}_{ij}$ is the direction vector from $(x_i,y_i)$ to $(x_j,y_j)$, $(x_i,y_i)$ represent the coordinates of the traffic target in the static state in the driving environment, $(x_j, y_j)$ represent the coordinates of the location in the driving environment based on the driving environment, $\vec{e}_{ij}$ is the unit vector in the $\vec{d}_{ij}$ direction, and $\varepsilon_1$ is a constant greater than 0.

16. The apparatus according to claim 11, wherein the instructions further cause the processor to be configured to:
   use a location point of the other vehicle as an initial iteration point of the risk field;
   perform iterative calculation on the risk field using a gradient descent method to obtain a plurality of iterative points; and
   determine a track formed by the plurality of iteration points as the driving track of the other vehicle in the driving environment.

17. The apparatus according to claim 11, wherein the instructions further cause the processor to be configured to:
   determine a track feature vector corresponding to the driving track of the other vehicle in the driving environment; and
   determine the driving intention of the other vehicle based on the track feature vector using a driving intention classifier.

18. The apparatus according to claim 17, wherein the instructions further cause the processor to be configured to:
   obtain n sampling points from the driving track of the other vehicle in the driving environment, wherein n is a natural number greater than 1;
   determine n−1 track direction angles of the driving track based on coordinates of the n sampling points in the driving environment; and
   a fourth determining subunit, configured to determine the track feature vector based on the n−1 track direction angles.

19. The apparatus according to claim 11, wherein the instructions further cause the processor to be configured to:
   determine whether the traffic target is the traffic target in the moving state or the traffic target in the static state based on status information of each of the traffic targets for each of the traffic targets in the driving environment;
   determine a kinetic energy field of the traffic target in the moving state based on the status information of the traffic target in the moving state when the traffic target is in the moving state, wherein a field strength of the kinetic energy field of the traffic target in the moving state is the risk degree value; and
   add kinetic energy fields of all traffic targets in the moving state and potential energy fields of all traffic targets in the static state in the driving environment together to obtain the risk field of the driving environment.

20. The apparatus according to claim 11, wherein the instructions further cause the processor to be configured to obtain environment perception data and map data of the driving environment.

* * * * *